United States Patent
Ko et al.

(10) Patent No.: US 12,150,097 B2
(45) Date of Patent: Nov. 19, 2024

(54) METHOD AND APPARATUS FOR MEASURING CBR RELATED TO PARTIAL SENSING IN NR V2X

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/101,841

(22) Filed: Jan. 26, 2023

(65) Prior Publication Data

US 2023/0171741 A1 Jun. 1, 2023

Related U.S. Application Data

(63) Continuation of application No. PCT/KR2022/000696, filed on Jan. 14, 2022.

(60) Provisional application No. 63/138,532, filed on Jan. 18, 2021, provisional application No. 63/137,596,
(Continued)

(51) Int. Cl.
*H04W 72/02* (2009.01)
*H04W 72/0446* (2023.01)
*H04W 72/25* (2023.01)
*H04W 72/54* (2023.01)

(52) U.S. Cl.
CPC ....... *H04W 72/02* (2013.01); *H04W 72/0446* (2013.01); *H04W 72/25* (2023.01); *H04W 72/54* (2023.01)

(58) Field of Classification Search
CPC ..... H04W 72/02; H04W 72/25; H04W 72/54; H04W 72/0446
See application file for complete search history.

(56) References Cited

U.S. PATENT DOCUMENTS

| | | | |
|---|---|---|---|
| 2020/0029245 | A1 | 1/2020 | Khoryaev et al. |
| 2020/0351705 | A1 | 11/2020 | Chae et al. |
| 2020/0359257 | A1 | 11/2020 | Kim et al. |

(Continued)

FOREIGN PATENT DOCUMENTS

| | | |
|---|---|---|
| CN | 111901785 | 11/2020 |
| KR | 1020200093517 | 8/2020 |

OTHER PUBLICATIONS

Korean Intellectual Property Office Application Serial No. 10-2023-7001480, Office Action dated Feb. 28, 2023, 7 pages.

(Continued)

*Primary Examiner* — Rhonda L Murphy
(74) *Attorney, Agent, or Firm* — LEE, HONG, DEGERMAN, KANG & WAIMEY

(57) ABSTRACT

In one embodiment, a method by which a first device performs wireless communication is proposed. The method may comprise the steps of: determining at least one first candidate slot for selecting a first sidelink (SL) resource; performing sensing of at least one first slot related to the at least one first candidate slot; and selecting the first SL resource in the at least one first candidate slot on the basis of the sensing. For example, a first channel busy ratio (CBR) related to the at least one first slot may be measured on the basis of the number of the at least one first slot that is greater than or equal to a first threshold value.

14 Claims, 18 Drawing Sheets

Related U.S. Application Data filed on Jan. 14, 2021, provisional application No. 63/137,585, filed on Jan. 14, 2021.

(56) References Cited

U.S. PATENT DOCUMENTS

| | | | |
|---|---|---|---|
| 2021/0075552 A1* | 3/2021 | Huang | H04L 1/1864 |
| 2021/0235328 A1* | 7/2021 | Hui | H04W 72/56 |
| 2023/0084593 A1* | 3/2023 | Hoang | H04W 72/02 |
| 2023/0269705 A1* | 8/2023 | Park | H04W 4/46 370/329 |

OTHER PUBLICATIONS

Robert Bosch GmbH, "Sidelink Resource Allocation to Reduce Power Consumption," 3GPP TSG-RAN WG1 #103-e, e-Meeting, R1-2009128, Nov. 2020, 6 pages.
CMCC, "Discussion on resource allocation for power saving," 3GPP TSG-RAN WG1 #103-e, e-Meeting, R1-2008031, Nov. 2020, 9 pages.
PCT International Application No. PCT/KR2022/000696, International Search Report dated Apr. 18, 2022, 6 pages.

* cited by examiner

METHOD AND APPARATUS FOR MEASURING CBR RELATED TO PARTIAL SENSING IN NR V2X

CROSS-REFERENCE TO RELATED APPLICATION(S)

This application is a continuation of International Application No. PCT/KR2022/000696, filed on Jan. 14, 2022, which claims the benefit of U.S. Provisional Application No. 63/137,585, filed on Jan. 14, 2021, 63/137,596, filed on Jan. 14, 2021, and 63/138,532, filed on Jan. 18, 2021, the contents of which are all incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, in sidelink communication, partial sensing may be performed to save power of a UE. In this case, for example, when a UE measures a channel busy ratio (CBR) based only on a slot in which partial sensing is performed, accuracy of CBR measurement may be lower than CBR measurement performed based on full sensing.

According to an embodiment of the present disclosure, a method for performing, by a first device, wireless communication is proposed. The method may comprise: determining at least one first candidate slot for selecting a first sidelink (SL) resource; performing sensing for at least one first slot related to the at least one first candidate slot; and selecting the first SL resource within the at least one first candidate slot based on the sensing. For example, first channel busy ratio (CBR) related to the at least one first slot maybe measured, based on a number of the at least one first slot greater than or equal to a first threshold.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: determine at least one first candidate slot for selecting a first sidelink (SL) resource; perform sensing for at least one first slot related to the at least one first candidate slot; and select the first SL resource within the at least one first candidate slot based on the sensing. For example, first channel busy ratio (CBR) related to the at least one first slot may be measured, based on a number of the at least one first slot greater than or equal to a first threshold.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: determine at least one first candidate slot for selecting a first sidelink (SL) resource; perform sensing for at least one first slot related to the at least one first candidate slot; and select the first SL resource within the at least one first candidate slot based on the sensing. For example, first channel busy ratio (CBR) related to the at least one first slot may be measured, based on a number of the at least one first slot greater than or equal to a first threshold.

According to an embodiment of the present disclosure, a non-transitory computer-readable storage medium storing instructions may be proposed. For example, the instructions, when executed, may cause a first device to: determine at least one first candidate slot for selecting a first sidelink (SL) resource; perform sensing for at least one first slot related to the at least one first candidate slot; and select the first SL resource within the at least one first candidate slot based on the sensing. For example, first channel busy ratio (CBR) related to the at least one first slot may be measured, based on a number of the at least one first slot greater than or equal to a first threshold.

According to an embodiment of the present disclosure, a method for performing, by a second device, wireless communication may be proposed. For example, the method may comprise: receiving, from a first device, first sidelink control information (SCI) including information for scheduling a physical sidelink shared channel (PSSCH) related to a physical sidelink control channel (PSCCH) through the PSCCH, based on a first sidelink (SL) resource; and receiving, from the first device, second SCI and data through the PSSCH, based on the first SL resource. For example, at least one first candidate slot for selecting the first SL resource may be determined. For example, sensing for at least one first slot related to the at least one first candidate slot may be performed. For example, the first SL resource may be selected within the at least one first candidate slot based on the sensing. For example, first channel busy ratio (CBR) related to the at least one first slot may be measured, based on a number of the at least one first slot greater than or equal to a first threshold.

According to an embodiment of the present disclosure, second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive, from a first device, first sidelink control information (SCI) including information for scheduling a physical sidelink shared channel (PSSCH) related to a physical sidelink control channel (PSCCH) through the PSCCH, based on a first sidelink (SL) resource; and receive, from the first device, second SCI and data through the PSSCH, based on the first SL resource. For example, at least one first candidate slot for selecting the first SL resource may be determined. For example, sensing for at least one first slot related to the at least one first candidate slot may be performed. For example, the first SL resource may be selected within the at least one first candidate slot based on the sensing. For example, first channel busy ratio (CBR) related to the at least one first slot may be measured, based on a number of the at least one first slot greater than or equal to a first threshold.

When a UE selects a resource based on partial sensing, loss of accuracy of CBR measurement can be minimized.

DETAILED DESCRIPTION

Figure 1:
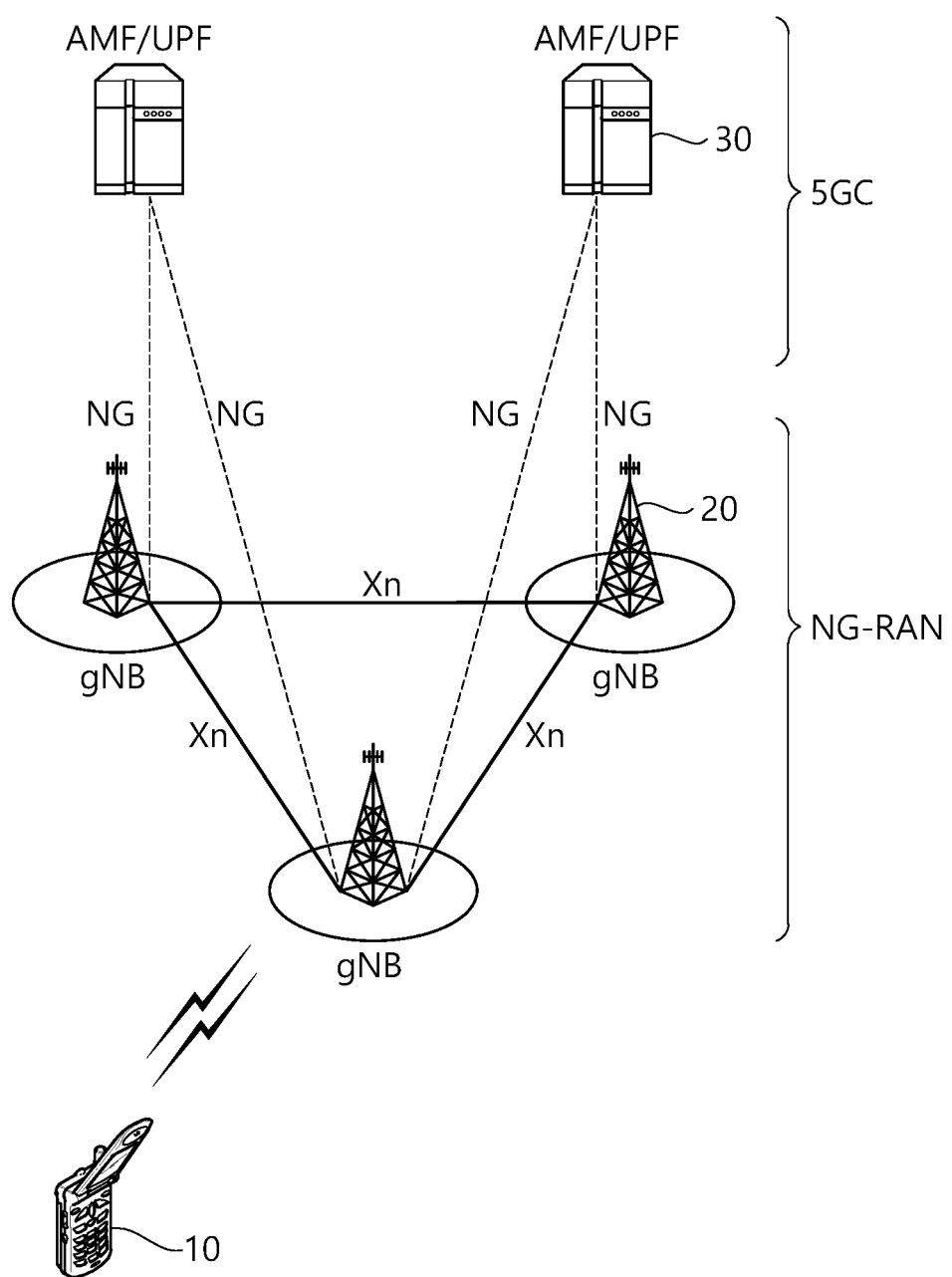
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, "when, if, or in case of" may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMITS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, a wireless communication standard document published before the present specification is filed may be referred to.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
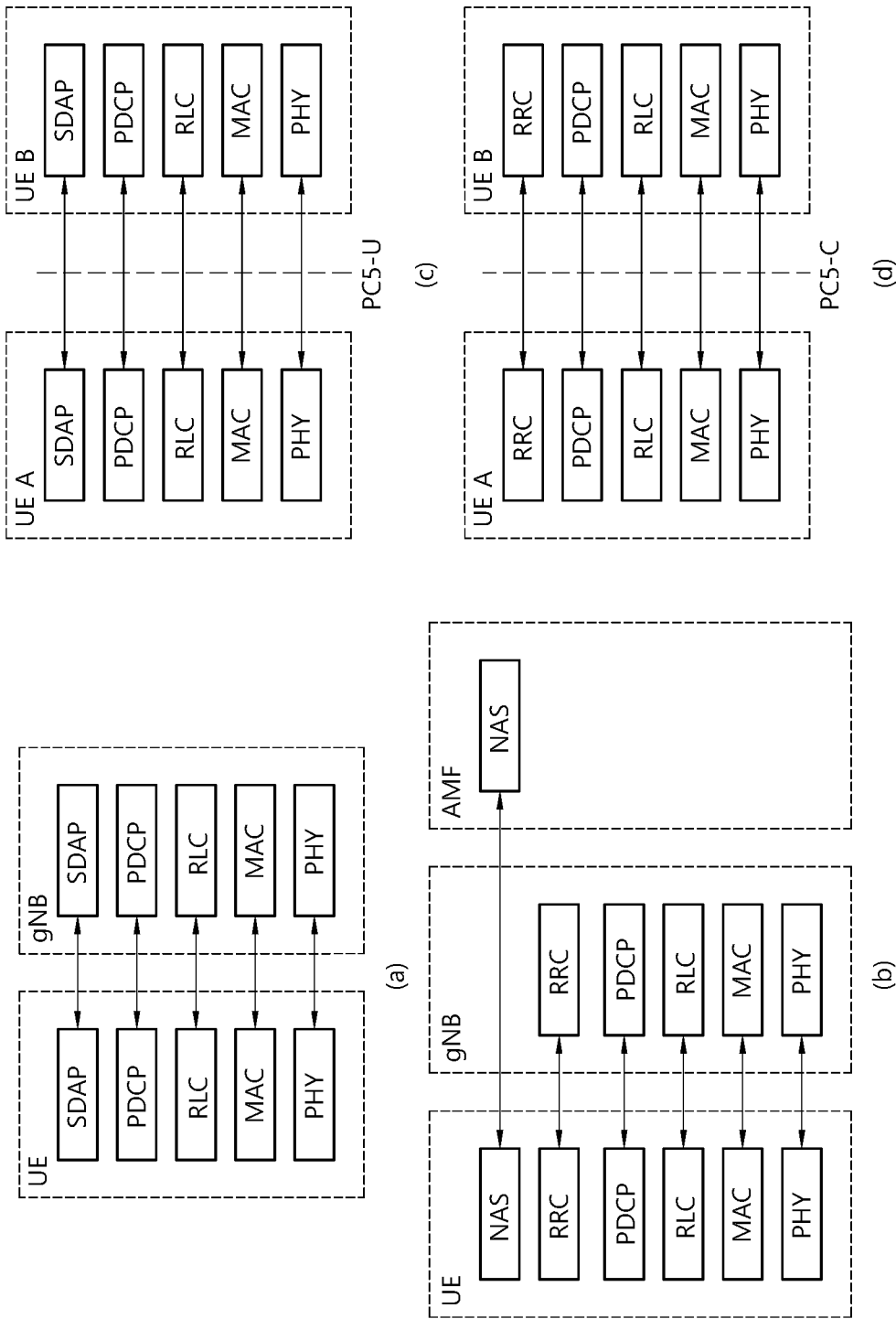
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
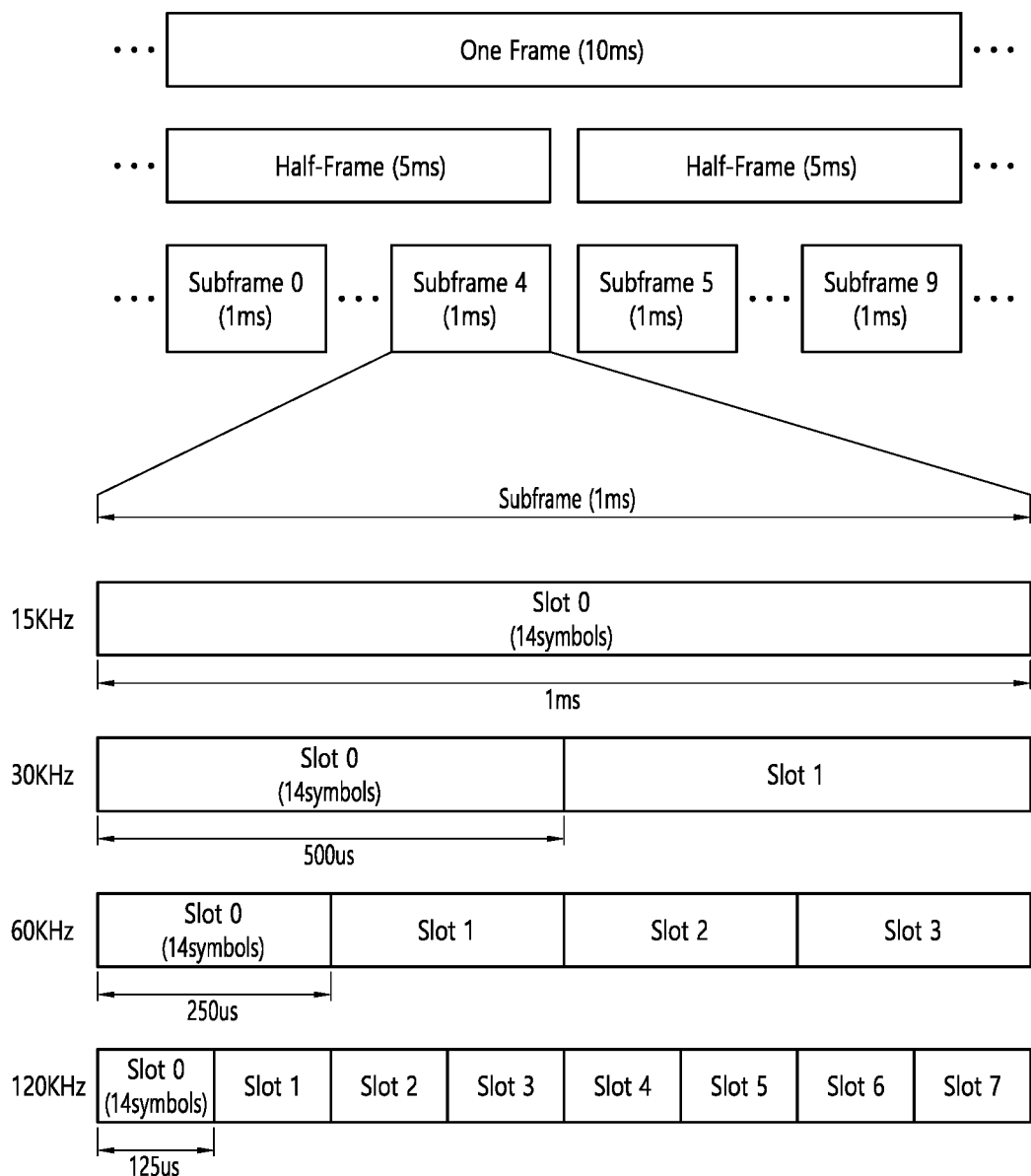
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$) and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{Subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
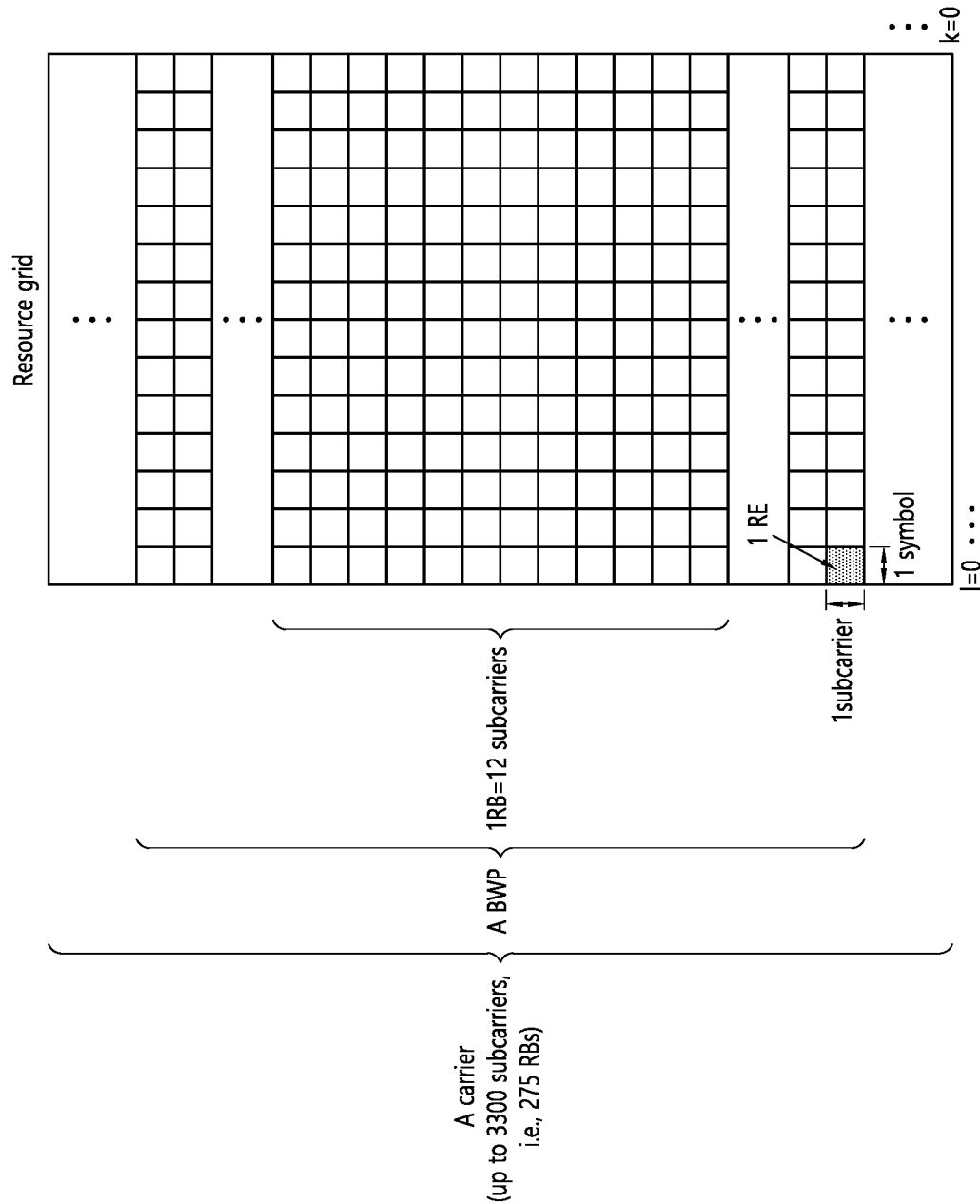
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols. A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on).

A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
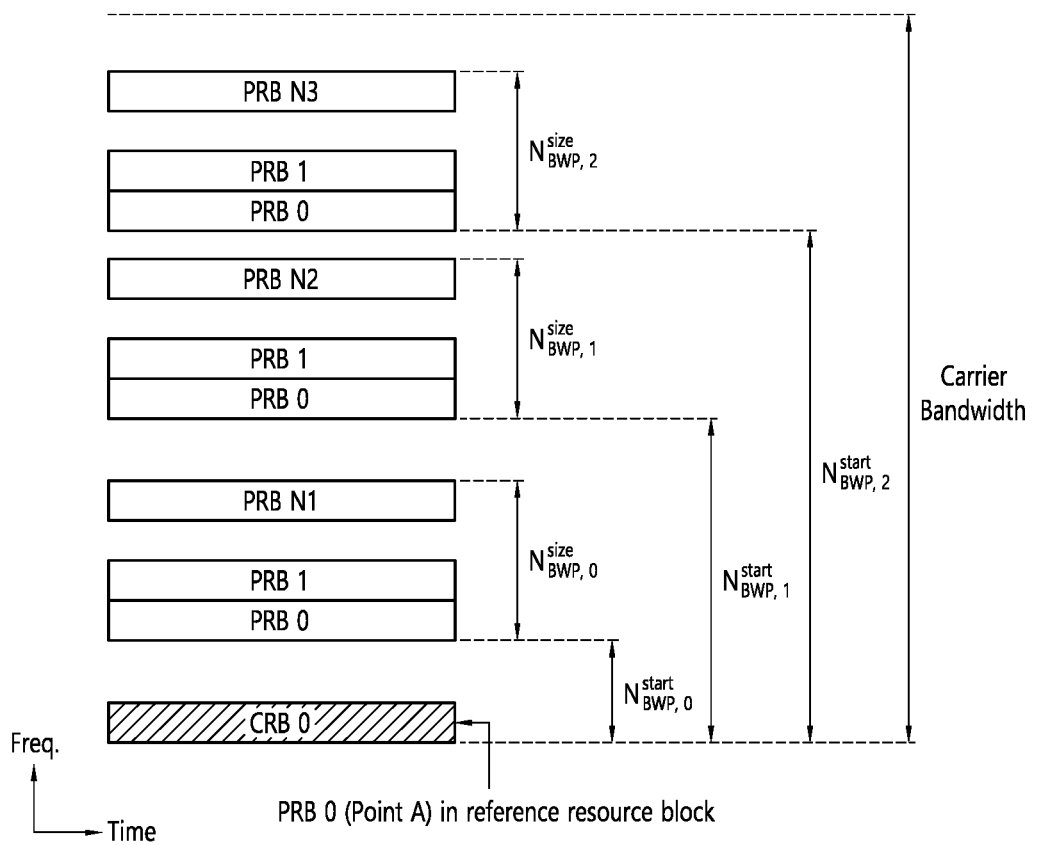
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
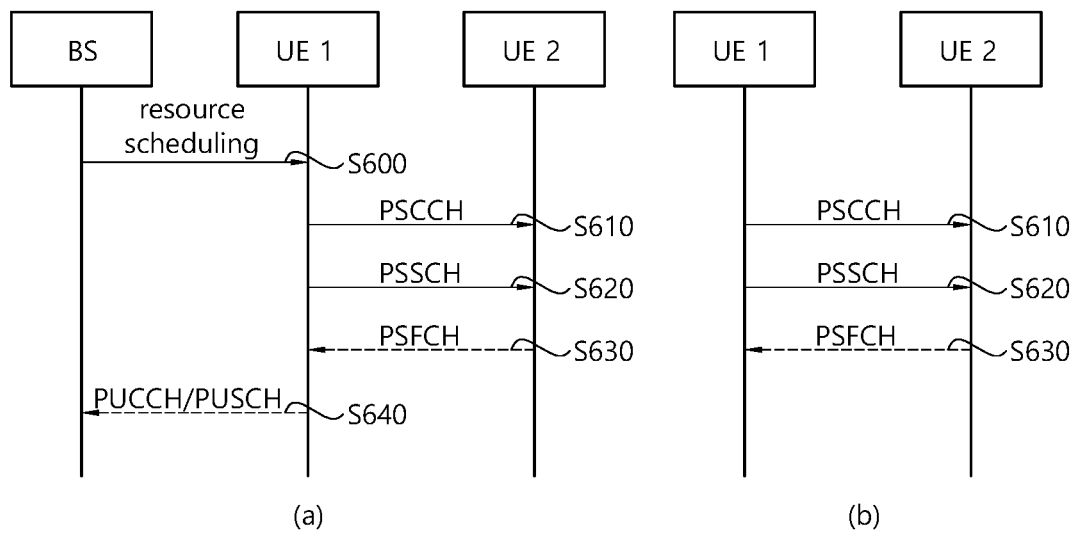
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Hereinafter, an example of DCI format 3_0 will be described.

DCI format 3_0 is used for scheduling of NR PSCCH and NR PSSCH in one cell.

The following information is transmitted by means of the DCI format 3_0 with CRC scrambled by SL-RNTI or SL-CS-RNTI Resource pool index—ceiling ($\log_2$ I) bits, where I is the number of resource pools for transmission configured by the higher layer parameter sl-TxPoolScheduling.

Time gap—3 bits determined by higher layer parameter sl-DCI-ToSL-Trans

HARQ process number—4 bits.

New data indicator—1 bit.

Lowest index of the subchannel allocation to the initial transmission—ceiling ($\log_2(N^{SL}_{subchannel})$) bits SCI format 1-A field: Frequency resource assignment, Time resource assignment PSFCH-to-HARQ feedback timing indicator—ceiling ($\log_2 N_{fb\_timing}$) bits, where $N_{fb\_timing}$ is the number of entries in the higher layer parameter sl-PSFCH-To-PUCCH, PUCCH resource indicator—3 bits Configuration index—0 bit if the UE is not configured to monitor DCI format 3_0 with CRC scrambled by SL-CS-RNTI; otherwise 3 bits. If the UE is configured to monitor DCI format 3_0 with CRC scrambled by SL-CS-RNTI, this field is reserved for DCI format 3_0 with CRC scrambled by SL-RNTI.

Counter sidelink assignment index—2 bits, 2 bits if the UE is configured with pdsch-HARQ-ACK-Codebook=dynamic, 2 bits if the UE is configured with pdsch-HARQ-ACK-Codebook=semi-static Padding bits, if required Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling ($\log_2 (N^{SL}_{subchannel}(N^{SL}_{subchannel}+1)/2)$) bits when the value of the higher layer parameter sl-MaxNumPerReserve is configured to 2; otherwise ceiling $\log_2(N^{SL}_{subChannel} (N^{SL}_{subChannel}+1)(2N^{SL}_{subchannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling (log $2N_{rsv\_period}$) bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling (log $2N_{pattern}$) bits, where $N_{pattern}$ is the number of DMRS patterns configured by higher layer parameter sl-PSSCH-DMRS-TimePattern-List $2^{nd}$ stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described. In HARQ operation, when HARQ-ACK information includes ACK or NACK, or when HARQ-ACK information includes only NACK, or when there is no feedback of HARQ-ACK information, SCI format 2-A is used for PSSCH decoding.

The following information is transmitted by means of the SCI format 2-A:

HARQ process number—4 bits
New data indicator—1 bit
Redundancy version—2 bits
Source ID—8 bits
Destination ID—16 bits
HARQ feedback enabled/disabled indicator—1 bit
Cast type indicator—2 bits as defined in Table 7
CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |

TABLE 7-continued

| Value of Cast type indicator | Cast type |
|---|---|
| 11 | Groupcast when HARQ-ACK information includes only NACK |

Hereinafter, an example of SCI format 2-B will be described. SCI format 2-B is used for PSSCH decoding and is used with HARQ operation when HARQ-ACK information includes only NACK or there is no feedback of HARQ-ACK information.

In HARQ operation, when HARQ-ACK information includes only NACK, or when there is no feedback of HARQ-ACK information, SCI format 2-B is used for decoding PSSCH.

The following information is transmitted by means of the SCI format 2-B:

HARQ process number—4 bits
New data indicator—1 bit
Redundancy version—2 bits
Source ID—8 bits
Destination ID—16 bits
HARQ feedback enabled/disabled indicator—1 bit
Zone ID—12 bits
Communication range requirement—4 bits determined by higher layer parameter sl-ZoneConfigMCR-Index Referring to (a) or (b) of FIG. 6, in step S630, a first UE may receive a PSFCH. For example, UE 1 and UE 2 may determine a PSFCH resource, and UE 2 may transmit HARQ feedback to UE 1 using a PSFCH resource. Referring to (a) of FIG. 6, in step S640, a first UE may transmit SL HARQ feedback to a base station through PUCCH and/or PUSCH.

Hereinafter, UE procedure for reporting HARQ-ACK on sidelink will be described.

A UE can be indicated by an SCI format scheduling a PSSCH reception, in one or more sub-channels from a number of $N^{PSSCH}_{subch}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled. A UE expects that a slot $t'^{SL}_k$ ($0 \le m < k < T_{max}$) has a PSFCH transmission occasion resource if k mod $N^{PSFCH}_{PSSCH}=0$, where $t'^{SL}_k$ is a slot that belongs to the resource pool, $T'_{max}$ is a number of slots that belong to the resource pool within 10240 msec, and $N^{PSFCH}_{PSSCH}$ is provided by sl-PSFCH-Period-r16. A UE may be indicated by higher layers to not transmit a PSFCH in response to a PSSCH reception. If a UE receives a PSSCH in a resource pool and the HARQ feedback enabled/disabled indicator field in an associated SCI format 2-A or a SCI format 2-B has value 1, the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE is provided by sl-PSFCH-RB-Set-r16 a set of $M^{PSFCH}_{PRB,set}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N^{PSFCH}_{PSSCH}$, the UE allocates the $[(i+j \cdot N^{PSFCH}_{PSSCH}) \cdot M^{PSFCH}_{subch,slot},$ $(i+1+j \cdot N^{PSFCH}_{PSSCH}) \cdot M^{PSFCH}_{subch,slot-1}]$ PRBs from the $M^{PSFCH}_{PRB,set}$ PRBs to slot i among the PSSCH slots associated with the PSFCH slot and sub-channel j, where $M^{PSFCH}_{subch,slot} = M^{PSFCH}_{PRB,set}/(N_{subch} \cdot N^{PSFCH}_{PSSCH})$, $0 \le i < N^{PSFCH}_{PSSCH}$, $0 \le j < N_{subch}$, and the allocation starts in an ascending order of i and continues in an ascending order of j. The UE expects that $M^{PSFCH}_{PRB,set}$ is a multiple of $N_{subch} \cdot N^{PSFCH}_{PSSCH}$.

A UE determines a number of PSFCH resources available for multiplexing HARQ-ACK information in a PSFCH transmission as $R^{PSFCH}_{PRB,CS} = N^{PSFCH}_{type} \cdot M^{PSFCH}_{subch,slot} \cdot N^{PSFCH}_{CS}$ where $N^{PSFCH}_{CS}$ is a number of cyclic shift pairs for the resource pool and, based on an indication by higher layers, $N^{PSFCH}_{type} = 1$ and the $M^{PSFCH}_{subch,slot}$ PRBs are associated with the starting sub-channel of the corresponding PSSCH $N^{PSFCH}_{type} = N^{PSSCH}_{subch}$ and the $N^{PSSCH}_{subch} \cdot M^{PSFCH}_{subch,slot}$ PRBs are associated with one or more sub-channels from the $N^{PSSCH}_{subch}$ sub-channels of the corresponding PSSCH The PSFCH resources are first indexed according to an ascending order of the PRB index, from the $N^{PSFCH}_{type} \cdot M^{PSFCH}_{subch,slot}$ PRBs, and then according to an ascending order of the cyclic shift pair index from the $N^{PSFCH}_{CS}$ cyclic shift pairs.

A UE determines an index of a PSFCH resource for a PSFCH transmission in response to a PSSCH reception as $(P_{ID} + M_{ID}) \bmod R^{PSFCH}_{PRB,CS}$ where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift a, from a cyclic shift pair index corresponding to a PSFCH resource index and from $N^{PSFCH}_{CS}$ using Table 8.

TABLE 8

| $N^{PSFCH}_{CS}$ | $m_0$ | | | | | |
|---|---|---|---|---|---|---|
| | cyclic shift pair index 0 | cyclic shift pair index 1 | cyclic shift pair index 2 | cyclic shift pair index 3 | cyclic shift pair index 4 | cyclic shift pair index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift a, as in Table 9 if the UE detects a SCI format 2-A with Cast type indicator field value of "01" or "10", or as in Table 10 if the UE detects a SCI format 2-B or a SCI format 2-A with Cast type indicator field value of "11". The UE applies one cyclic shift from a cyclic shift pair to a sequence used for the PSFCH transmission.

TABLE 9

| HARQ-ACK Value | 0 (NACK) | 1 (ACK) |
|---|---|---|
| Sequence cyclic shift | 0 | 6 |

TABLE 10

| HARQ-ACK Value | 0 (NACK) | 1 (ACK) |
|---|---|---|
| Sequence cyclic shift | 0 | N/A |

Figure 7:
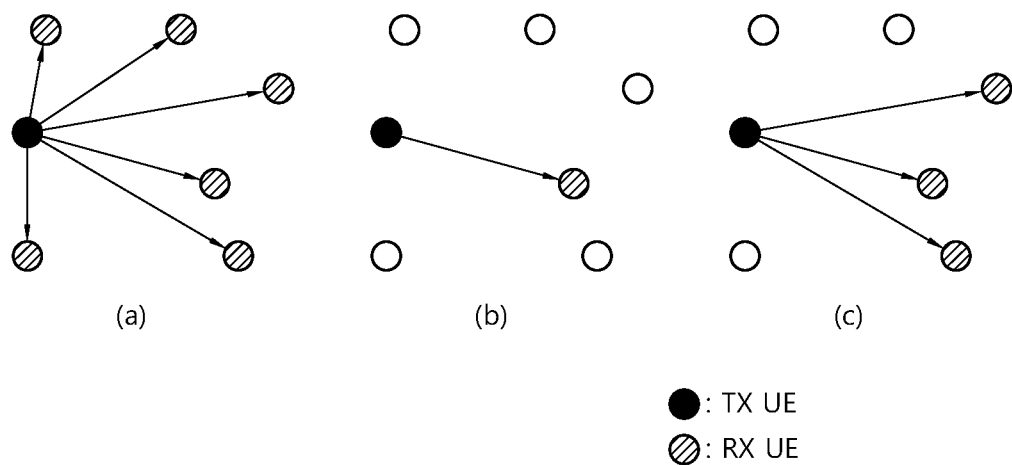
FIG. 7 shows three cast types, based on an embodiment of the present disclosure.

FIG. 7 shows three cast types, in accordance with an embodiment of the present disclosure. The embodiment of FIG. 7 may be combined with various embodiments of the present disclosure. Specifically, FIG. 7(a) shows broadcast-type SL communication, FIG. 7(b) shows unicast type-SL communication, and FIG. 7(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a UE procedure for determining a subset of resources to be reported to a higher layer in PSSCH resource selection in sidelink resource allocation mode 2 will be described.

In resource allocation mode 2, a higher layer may request a UE to determine a subset of resources, from which the higher layer will select a resource for PSSCH/PSCCH transmission. To trigger this procedure, in slot n, a higher layer provides the following parameters for a PSSCH/PSCCH transmission.

the resource pool from which the resources are to be reported;

L1 priority, $prio_{TX}$;

the remaining packet delay budget;

the number of sub-channels to be used for the PSSCH/PSCCH transmission in a slot, $L_{subCH}$;

optionally, the resource reservation interval, $P_{rsvp\_TX}$, in units of msec.

if the higher layer requests the UE to determine a subset of resources from which the higher layer will select resources for PSSCH/PSCCH transmission as part of re-evaluation or pre-emption procedure, the higher layer provides a set of resources $(r_0, r_1, r_2, \ldots)$ which may be subject to re-evaluation and a set of resources $(r_0, r_1, r_2, \ldots)$ which may be subject to pre-emption.

it is up to UE implementation to determine the subset of resources as requested by higher layers before or after the slot $r''_i - T_3$, where $r''_i$ is the slot with the smallest slot index among $(r_0, r_1, r_2, \ldots)$ and $(r'_0, r'_1, r'_2, \ldots)$, and $T_3$ is equal to $T^{SL}_{proc,1}$, where $T^{SL}_{proc,1}$ is defined in slots in Table X1, where $\mu_{SL}$ is the SCS configuration of the SL B WP.

Following higher layer parameters affect this procedure:

sl-SelectionWindowList: internal parameter $T_{2min}$ is set to the corresponding value from higher layer parameter sl-SelectionWindowList for the given value of $prio_{TX}$.

sl-Thres-RSRP-List: this higher layer parameter provides an RSRP threshold for each combination $(p_i, p_j)$, where $p_i$ is the value of the priority field in a received SCI format 1-A and $p_j$ is the priority of the transmission of the UE selecting resources; for a given invocation of this procedure, $p_j$=$prio_{TX}$.

sl-RS-ForSensing selects if the UE uses the PSSCH-RSRP or PSCCH-RSRP measurement.

sl-ResourceReservePeriodList sl-SensingWindow: internal parameter $T_0$ is defined as the number of slots corresponding to sl-SensingWindow msec sl-TxPercentageList: internal parameter X for a given $prio_{TX}$ is defined as sl-TxPercentageList ($prio_{TX}$) converted from percentage to ratio sl-PreemptionEnable: if sl-PreemptionEnable is provided, and if it is not equal to 'enabled', internal parameter $prio_{pre}$ is set to the higher layer provided parameter sl-PreemptionEnable.

The resource reservation interval, $P_{rsvp\_TX}$, if provided, is converted from units of msec to units of logical slots, resulting in $P'_{rsvp-TX}$.

Notation:

$(t'^{SL}_0, t'^{SL}_1, t'^{SL}_2, \ldots)$ denotes the set of slots which belongs to the sidelink resource pool.

For example, a UE may select a set of candidate resources $(S_A)$ based on Table 11. For example, when resource (re) selection is triggered, a UE may select a candidate resource set $(S_A)$ based on Table 11. For example, when re-evaluation or pre-emption is triggered, a UE may select a candidate resource set $(S_A)$ based on Table 11.

TABLE 11

The following steps are used:
1) A candidate single-slot resource for transmission $R_{x,y}$ is defined as a set of $L_{subCH}$ contiguous sub-channels with sub-channel x + j in slot $t_y^{'SL}$ where j = 0, . . . , $L_{subCH}$ − 1. The UE shall assume that any set of $L_{subCH}$ contiguous sub-channels included in the corresponding resource pool within the time interval $\lceil n + T_1, n + T_2 \rceil$ correspond to one candidate single-slot resource, where selection of $T_1$ is up to UE implementation under $0 \leq T_1 \leq T_{proc,1}^{SL}$, where $T_{proc,1}^{SL}$ is defined in slots in Table 8.1.4-2 where $\mu_{SL}$ is the SCS configuration of the SL BWP;
if $T_{2min}$ is shorter than the remaining packet delay budget (in slots) then $T_2$ is up to UE implememation subject to $T_{2min} \leq T_2 \leq$ remaining packet delay budget (in stots); otherwise $T_2$ is set to the remaining packet delay budget (in slots).
The total number of candidate single-slot resources is denoted by $M_{total}$.
2) The sensing window is defined by the range of slots $(n − T_0, n − T_{proc,0}^{SL})$ where $T_0$ is defined above and $T_{proc,0}^{SL}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.
3) The internal parameter Th($p_i$, $p_j$) is set to the corresponding value of RSRP threshold indicated by the i-th field in sl-Thres-RSRP-List, where i = $p_i$ + ($p_j$ − 1) * 8.
4) The set $S_A$ is initialized to the set of all the candidate single-slot resources.
5) The UE shall exclude any candidate single-slot resource $R_{x,y}$ from the set $S_A$ if it meets all the following conditions:
the UE has not monitored slot $t'^{SL}_m$ in Step 2.
for any periodicity value allowed by the higher layer parameter sl-ResourceReservePeriodList and a hypothetical SCI format 1-A received in slot $t'^{SL}_m$ with 'Resource reservation period' field set to that periodicity value and indicating all subchannels of the resource pool in this slot, condition c in step 6 would be met.
5a) If the number of candidate single-slot resources $R_{x,y}$ remaining in the set $S_A$ is smaller than X. $M_{total}$, the set $S_A$ is initialized to the set of all the candidate single-slot resources as in step 4.
6) The UE shall exclude any candidate single-slot resource $R_{x,y}$ from the set $S_A$ if it meets all the following conditions:
a) the UE receives an SCI format 1-A in slot $t'^{SL}_m$, and 'Resource reservation period' field, if present, and 'Priority' field in the received SCI format 1-A indicate the values $P_{rsvp,RX}$ and $prio_{RX}$, respectively;
b) the RSRP measurement performed, for the received SCI format 1-A, is higher than Th($prio_{RX}$, $prio_{TX}$);
c) the SCI format received in slot $t'^{SL}_m$ or the same SCI format which, if and only if the 'Resource reservation period' field is present in the received SCI format 1-A, is assumed to be received in slot(s) $t'^{SL}_{m+q \times P'_{rsvp,RX}}$ determines the set of resource blocks and slots which overlaps with $R_{x,y+j \times P'_{rsvp,TX}}$ for q = 1, 2, . . . , Q and j = 0, 1, . . . , $C_{resel}$ − 1. Here, $P'_{rsvp,RX}$ is $P_{rsvp,RX}$ converted to units of logical slots, $Q = \left\lceil \dfrac{T_{scal}}{P_{rsvp\_RX}} \right\rceil$ if $P_{rsvp\_RX} < T_{scal}$ and $n' − m \leq P'_{rsvp\_RX}$, where $t'^{SL}_{n'} = n$ if slot n belongs to the set $(t'^{SL}_0, t'^{SL}_1, \ldots, t'^{SL}_{T_{max}-1})$, otherwise slot $t'^{SL}_{n'}$ is the first slot after slot n belonging to the set $(t'^{SL}_0, t'^{SL}_1, \ldots, t'^{SL}_{T_{max}-1})$; otherwise Q = 1. $T_{scal}$ is set to selection window size $T_2$ converted to units of msec.
7) If the number of candidate single-slot resources remaining in the set $S_A$ is smaller than X · $M_{total}$, then Th($p_i$, $p_j$) is increased by 3 dB for each priority value Th($p_i$, $p_j$) and the procedure continues with step 4.
The UE shall report set $S_A$ to higher layers.
If a resource $r_i$ from the set $(r_0, r_1, r_2, \ldots)$ is not a member of $S_A$, then the UE shall report re-evaluation of the resource $r_i$ to higher layers.
If a resource $r'_i$ from the set $(r'_0, r'_1, r'_2, \ldots)$ meets the conditions below then the UE shall report pre-emption of the resource $r'_i$ to higher layers
  $r'_i$ is not a membet of $S_A$, and
  $r'_i$ meets the conditions for exclusion in step 6, with Th($prio_{RX}$, $prio_{TX}$) set to the final threshold

TABLE 11-continued after executing steps 1)-7), i.e. including all necessary increments for reaching $X \cdot M_{total}$, and the associated priority $prio_{RX}$, satisfies one of the following conditions:
    sl-PreemptionEnable is provided and is equal to 'enabled' and $prio_{TX} > prio_{RX}$
    sl-PreemptionEnable is provided and is not equal to 'enabled', and $prio_{RX} \leq prio_{pre}$ and $prio_{TX} > prio_{RX}$

---

Meanwhile, partial sensing may be supported for power saving of a UE. For example, in LTE SL or LTE V2X, a UE may perform partial sensing based on Tables 9 and 10.

TABLE 12

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers.
In sidelink transmission mode 3, when requested by higher layers in subframe n for a carrier, the UE shall determine the set of resources to be reported to higher layers in sensing measurement according to the steps described in this Subclause. Parameters $L_{subCB}$, $P_{rsvp\_TX}$ and $prio_{TX}$ are all provided by higher layers. $C_{resel}$ is determined by $C_{resel} = 10 * \text{SL\_RESOURCE\_RESELECTION\_COUNTER}$, where SL_RESOURCE_RESELECTION_COUNTER is provided by higher layers.

...

If partial sensing is configured by higher layers then the following steps are used:
1) A candidate single-subfame resource for PSSCH transmission $R_{x,y}$ is defined as a set of $L_{subCH}$ contiguous sub-channels with sub-channel $x * j$ in subframe $t_y^{SL}$ where $j = 0, \ldots, L_{subCH} - 1$. The UE shall determine by its implementation a set of subframes which consists of at least Y subframes within the time interval $[n + T_1, n + T_2]$ where selections of $T_1$ and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool within the determined set of subframes correspond to one candidate single-subframe resource. The total number of the candidate single-subframe resources is denoted by $M_{total}$.
2) If a subframe $t_y^{SL}$ is included in the set of subframes in Step 1, the UE shall monitor any subframe $t_{y-k/P_{rsvp}}^{SL}$ if k-th bit of the high layer parameter gapCandidateSensing is set to 1. The UE shall perform the behavior in the following steps based on PSCCH decoded and S-RSSI measured in these subframes.
3) The parameter $Th_{n,b}$ is set to the value indicated by the i-th SL-ThresPSSCH-RSRP field in SL-ThresPSSCH-RSRP-List where $i = (a - 1) * 8 + b$.
4) The set $S_A$ is initialized to the union of all the candidate single-subframe resources. The set $S_B$ is initialized to an empty set.
5) The UE shall exclude any candidate single-subframe resource $R_{x,y}$ from the set $S_A$ if it meets all the following conditions:
    the UE receives an SCI format 1 in subframe $t_m^{SL}$, and "Resource reservation" field and "Priority" field in the received SCI format 1 indicate the values $P_{rsvp\_RX}$ and $prio_{RX}$, respectively.
    PSSCH-RSRP measurement according to the received SCI format 1 is higher than $Th_{prio_{TX},prio_{RX}}$.
    the SCI format received in subframe $t_m^{SL}$ or the same SCI format 1 which is assumed to be received in subframe(s) $t_{m+q \times P_{rsvp} \times P_{rsvp\_RY}}^{SL}$ determines according to 14.1.1.4C the set of resource blocks and subframes which overlaps with $R_{x,y+j,u_{m,RX}}$ for $q = 1, 2, \ldots, Q$ and $j = 0, 1, \ldots, C_{resel} - 1$. Here, $$Q = \frac{1}{P_{rsvp\_RX}} \text{ if } P_{rsvp\_RX} < 1 \text{ and } y' - m \leq P_{stop} \times P_{rsvp\_RX} + P_{stop}, \text{ where } i_{y'}^{SL} \text{ is the}$$

last subframe of the Y subframes, and $Q = 1$ otherwise.
6) If the number of candidate single-subframe resources remaining in the set $S_A$ is smaller than $0.2 \cdot M_{total}$ then Step 4 is repeated with $Th_{a,b}$ increased by 3 dB.

TABLE 13

7) For a candidate single-subframe resource $R_{x,y}$ remaining in the set $S_A$, the metric $E_{x,y}$ is defined as the linear average of S-RSSI measured in sub-channels $x + k$ for $k = 0, \ldots, L_{subCH}-1$ in the monitored subframes in Step 2 that can be expressed by $t_{y-P_{step}*j}^{SL}$ for a non-negative integer j.
8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.
9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the TABLE 13-continued already selected resources due to its limitation in the number of simultaneous
transmission carriers, its limitation in the supported carrier combinations, or interruption
for RF retuning time.
The UE shall report set $S_B$ to higher layers.
If transmission based on random selection is configured by upper layers and when the UE
is configured by upper layers to transmit using resource pools on multiple carriers, the
following steps are used:
1) A candidate single-subframe resource for PSSCH transmission $R_{x,y}$ is defined as a set
   of $L_{subCI}$ contiguous sub-channels with sub-channel x + j in subframe $t_y^{SL}$ where
   j = 0, . . . , $L_{subCH}$−1. The UE shall assume that any set of $L_{subCI}$ contiguous sub-channels
   included in the corresponding PSSCH resource pool within the time interval
   [n + $T_1$, n + $T_2$] corresponds to one candidate single-subframe resource, where selections
   of $T_1$ and $T_2$ are up to UE implementations under $T_1 \leq 4$ and
   $T_{2min}$ ($prio_{TX}$) $\leq T_2 \leq 100$, if $T_{2min}$ ($prio_{TX}$) is provided by higher layers for $prio_{TX}$,
   otherwise $20 \leq T_2 \leq 100$ UE selection of $T_2$ shall fulfil the latency requirement. The
   total number of the candidate single-subframe resources is denoted by $M_{total}$.
2) The set $S_A$ is initialized to the union of all the candidate single-subframe resources. The set
   $S_B$ is initialized to an empty set.
3) The UE moves the candidate single-subframe resource $R_{x,y}$ from the set $S_A$ to $S_B$.
4) The UE shall exclude a candidate single-subframe resource $R_{x,y}$ from $S_B$ if the UE does
   not support transmission in the candidate single-subframe resource in the carrier under the
   assumption that transmissions take place in other carrier(s) using the already selected
   resources due to its limitation in the number of simultaneous transmission carriers, its
   limitation in the supported carrier combinations, or interruption for RF retuning time].
The UE shall report set $S_B$ to higher layers.

Hereinafter, SL congestion control (sidelink congestion control) will be described.

For example, a UE may determine whether energy measured in a unit time/frequency resource is equal to or greater than a predetermined level, and the UE may adjust the amount and frequency of its own transmission resources according to the ratio of unit time/frequency resources in which energy of a certain level or higher is observed. In the present specification, a ratio of time/frequency resources in which energy of a certain level or higher is observed may be defined as a channel busy ratio (CBR). A UE may measure the CBR for each channel/frequency. Additionally, a UE may transmit the measured CBR to a network/base station.

Figure 8:
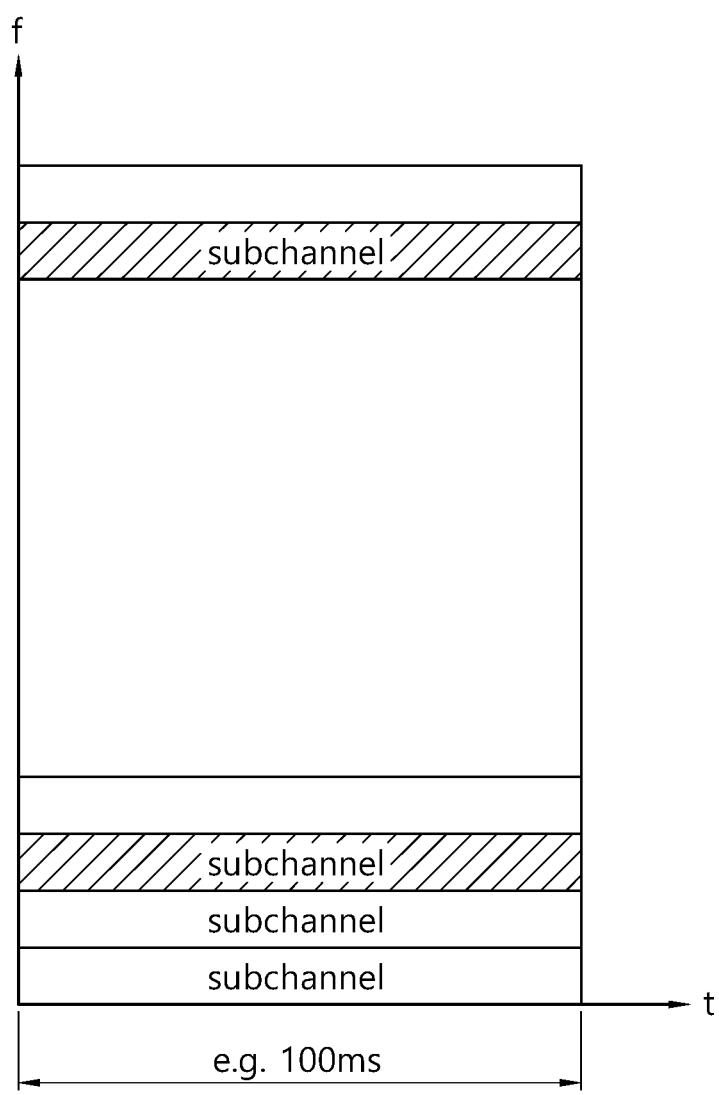
FIG. 8 shows a resource unit for CBR measurement according to an embodiment of the present disclosure.

FIG. 8 shows a resource unit for CBR measurement according to an embodiment of the present disclosure. The embodiment of FIG. 8 may be combined with various embodiments of the present disclosure.

Referring to FIG. 8, CBR may mean the number of subchannels for which the RSSI measurement result value is equal to or greater than a pre-configured threshold, as a result of the UE measuring Received Signal Strength Indicator (RSSI) in units of subchannels for a specific period (e.g., 100 ms). Alternatively, CBR may mean a ratio of subchannels having a value equal to or greater than a pre-configured threshold among subchannels during a specific period. For example, in the embodiment of FIG. 8, if it is assumed that the hatched subchannel is a subchannel having a value equal to or greater than a pre-configured threshold value, CBR may mean a ratio of hatched subchannels during a 100 ms interval. Additionally, a UE may report the CBR to a base station.

For example, when a PSCCH and a PSSCH are multiplexed in the frequency domain, a UE can perform one CBR measurement for one resource pool. Here, if a PSFCH resource is configured or previously configured, the PSFCH resource may be excluded from the CBR measurement.

Furthermore, congestion control considering the priority of traffic (e.g., packets) may be required. To this end, for example, a UE may measure channel occupancy ratio (CR). Specifically, a UE measures the CBR, and may determine the maximum value (CRlimitk) of the channel occupancy ratio (Channel Occupancy Ratio k, CRk) that traffic corresponding to each priority (e.g., k) can occupy according to the CBR. For example, a UE may derive the maximum value (CRlimitk) of the channel occupancy for the priority of each traffic based on a predetermined table of CBR measurement values. For example, in the case of traffic having a relatively high priority, a UE may derive a maximum value of a relatively large channel occupancy. Thereafter, a UE may perform congestion control by limiting the sum of channel occupancy rates of traffics whose priority k is lower than i to a predetermined value or less. According to this method, a stronger channel occupancy limit may be applied to traffic having a relatively lower priority.

In addition, a UE may perform SL congestion control using methods such as transmission power size adjustment, packet drop, retransmission decision, transmission RB size adjustment (MCS adjustment), and the like.

Table 14 shows an example of SL CBR and SL RSSI.

TABLE 14

SL CBR

| | |
|---|---|
| Definition | SL Channel Busy Ratio (SL CBR) measured in slot n is defined as the portion of sub-channels in the resource pool whose SL RSSI measured by the UE exceed a (pre-)configured threshold sensed over a CBR measurement window [n-a, n-1], wherein a is equal to 100 or 100·$2^\mu$ slots, according to higher layer parameter timeWindowSize-CBR |

TABLE 14-continued

| | |
|---|---|
| Applicable for | RRC_IDLE intra-frequency,<br>RRC_IDLE inter-frequency,<br>RRC_CONNECTED intra-frequency,<br>RRC_CONNECTED inter-frequency |
| SL RSSI | |
| Definition | Sidelink Received Signal Strength indicator (SL RSSI) is defined as the linear average of the total received power (in [W]) observed in the configured sub-channel in OFDM symbols of a slot configured for PSCCH and PSSCH, starting from the $2^{nd}$ OFDM symbol.<br>For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. |
| Applicable for | RRC_IDLE intra-frequency,<br>RRC_IDLE inter-frequency,<br>RRC_CONNECTED intra-frequency,<br>RRC_CONNECTED inter-frequency |

Meanwhile, when a UE that selects a resource based on partial sensing measures a CBR based only on a partial sensing slot, a problem in which accuracy of the measured CBR may be reduced may occur.

According to various embodiments of the present disclosure, a method and device for minimizing loss of CBR measurement accuracy by a UE that selects a resource based on partial sensing are proposed.

For example, whether to apply various embodiments of the present disclosure is configured independently or differently for at least one of element/parameter such as a service type, LCH-related priority, service-related priority, QoS requirements (e.g. latency, reliability, minimum coverage), PQI parameters, LCH/MAC PDU transmission with HARQ feedback enabled, HARQ feedback disabled LCH/MAC PDU transmission, CBR measurement value of resource pool, SL cast type (e.g., unicast, groupcast, broadcast), SL groupcast HARQ feedback option (e.g., NACK ONLY based feedback, ACK/NACK-based feedback, TX-RX distance-based NACK ONLY feedback), SL mode 1 CG type (e.g., SL CG type 1, SL CG type 2), SL mode type (e.g., mode 1, mode 2), resource pool, whether a resource pool is a resource pool where a PSFCH resource is configured, a source ID, a destination ID, a source L2 ID, a destination L2 ID, PC5 RRC connection link, SL link, connection status with a base station (e.g., RRC CONNECTED status, IDLE status, INACTIVE status), SL HARQ process, SL HARQ process ID, whether to perform SL DRX operation of a TX UE or an RX UE, whether it is a power saving UE, when PSFCH TX and PSFCH RX overlap from the point of view of a specific UE, when multiple PSFCH TXs exceeding the UE capability overlap, when PSFCH TX and/or PSFCH RX are omitted, when RX UE actually successfully receives PSCCH and/or PSSCH (re)transmission from TX UE, etc.

For example, a parameter setting value related to various embodiments of the present disclosure may be configured independently or differently for at least one of element/parameter such as a service type, LCH-related priority, service-related priority, QoS requirements (e.g. latency, reliability, minimum coverage), PQI parameters, LCH/MAC PDU transmission with HARQ feedback enabled, HARQ feedback disabled LCH/MAC PDU transmission, CBR measurement value of resource pool, SL cast type (e.g., unicast, groupcast, broadcast), SL groupcast HARQ feedback option (e.g., NACK ONLY based feedback, ACK/NACK-based feedback, TX-RX distance-based NACK ONLY feedback), SL mode 1 CG type (e.g., SL CG type 1, SL CG type 2), SL mode type (e.g., mode 1, mode 2), resource pool, whether a resource pool is a resource pool where a PSFCH resource is configured, a source ID, a destination ID, a source L2 ID, a destination L2 ID, PC5 RRC connection link, SL link, connection status with a base station (e.g., RRC CONNECTED status, IDLE status, INACTIVE status), SL HARQ process, SL HARQ process ID, whether to perform SL DRX operation of a TX UE or an RX UE, whether it is a power saving UE, when PSFCH TX and PSFCH RX overlap from the point of view of a specific UE, when multiple PSFCH TXs exceeding the UE capability overlap, when PSFCH TX and/or PSFCH RX are omitted, when RX UE actually successfully receives PSCCH and/or PSSCH (re)transmission from TX UE, etc.

And, in various embodiments of the present disclosure, "configuration" or "designation" may mean a form in which a base station informs a UE through a predefined channel/signal (e.g., SIB, RRC, MAC CE). For example, "configuration" or "designation" may mean a form in which it is supported through a PRE-CONFIGURATION. For example, "configuration" or "designation" may mean a form in which a UE informs another UE through a predefined channel/signal (e.g., SL MAC CE, PC5 RRC). Here, for example, a channel/signal may include a channel/signal for a physical layer or a higher layer.

Additionally, in various embodiments of the present disclosure, for example, "PSFCH" may be replaced with at least one of NR PSSCH, NR PSCCH, NR SL SSB, LTE PSSCH, LTE PSCCH, LTE SL SSB, and UL channel/signal.

For example, in various embodiments of the present disclosure, a "specific threshold value" may mean a threshold value that is predefined or (pre)configured by at least one of a network, a base station, or a higher layer (including an application layer) of a UE. Hereinafter, "specific setting value" may mean a value predefined or (pre)configured by at least one of a network, a base station, or an upper layer of a UE. Here, for example, an upper layer of a UE may include an application layer.

For example, in various embodiments of the present disclosure, "configured by network/base station" may mean an operation in which a base station (pre)configures a UE by higher layer RRC signaling, configures/signals a UE through MAC CE, or signals a UE through DCI.

For example, in various embodiments of the present disclosure, periodic-based partial sensing (PPS) may mean an operation of performing sensing at a time point corresponding to an integer multiple (k) of each period based on the number of periods corresponding to a specific setting value when performing sensing for resource selection. For example, the period may be a period of a transmission resource configured in a resource pool. For example, it is possible to sense a resource at a time point ahead by an integer multiple k value of each period prior in time from the time point of the candidate resource to be determined for resource collision. For example, the k value may be configured in a bitmap format.

For example, in various embodiments of the present disclosure, continuous partial sensing (CPS) may refer to an operation of performing sensing for all or part of a time domain given a specific setting value. For example, CPS may include a short-term sensing operation in which sensing is performed for a relatively short period.

For example, CBR may be measured as a ratio of the number of resources having received signal strength (e.g., RSSI) exceeding a specific threshold to the total number of valid resources in an SL resource pool. For example, CBR may be measured as a ratio of the number of resources having received signal strength (e.g., RSSI) exceeding a specific threshold to the total number of valid resources included in a CBR measurement window or sensing window within an SL resource pool.

According to an embodiment of the present disclosure, a UE performing partial sensing may use the following number of resources as the number of valid total resources for CBR calculation.

For example, a UE performing partial sensing may use the total number of valid resources in an SL resource pool as the total number of valid resources for CBR calculation. For example, a UE performing partial sensing may use the total number of valid resources included in a CBR measurement window or sensing window within an SL resource pool as the total number of valid resources for CBR calculation.

For example, a UE performing partial sensing may use the total number of valid resources in a partial sensing slot in which sensing is performed before resource (re)selection is triggered as the total number of valid resources for CBR calculation.

For example, a UE performing partial sensing may use the sum of the number of total valid resources within a partial sensing slot that was sensed before resource (re)selection was triggered and the total number of valid resources within slots additionally sensed for resource re-evaluation and/or pre-emption checking after resource selection as the total number of valid resources for CBR calculation.

For example, a UE performing partial sensing may use a specific setting value configured separately from a UE performing full sensing or a value configured by network as the total number of valid resources for CBR calculation.

For example, a first method of using the total number of valid resources in a partial sensing slot in which sensing is performed before the resource (re)selection is triggered may be applied when only periodic transmission is configured to be allowed in a resource pool.

For example, the first method may be applied when both periodic transmission and aperiodic transmission are allowed.

For example, the first method may be applied when it is configured to allow only resource selection based on partial sensing.

For example, the first method may be applied when both partial sensing-based resource selection and random resource selection are allowed, and resource re-evaluation or pre-emption confirmation is not allowed.

For example, a second method of using the sum of the total number of valid resources in partial sensing slots in which sensing was performed before resource (re)selection was triggered and the total number of valid resources in slots additionally sensed for resource re-evaluation and/or pre-emption checking after resource selection may be applied when only periodic transmission is configured to be allowed in a resource pool.

For example, the second method may be applied when both periodic transmission and aperiodic transmission are allowed.

For example, the second method may be applied when it is configured to allow only resource selection based on partial sensing.

For example, the second method may be applied when both partial sensing-based resource selection and random resource selection are allowed, and resource re-evaluation or pre-emption confirmation is not allowed.

According to an embodiment of the present disclosure, a UE performing partial sensing may use the following number of resources as the number of resources having received signal strength (e.g., RSSI) exceeding the specific threshold for CBR calculation.

For example, a UE performing partial sensing may use, as the number of resources for CBR calculation, the number of resources having received signal strength (e.g., RSSI) exceeding the specific threshold in a partial sensing slot in which sensing is performed before resource (re)selection is triggered.

For example, a UE performing partial sensing may use the sum of the number of resources having received signal strength (e.g., RSSI) exceeding the specific threshold within partial sensing slots in which sensing was performed before resource (re)selection was triggered and the number of resources whose received signal strength (e.g., RSSI) exceeds the specific threshold in slots additionally sensed for resource re-evaluation and/or pre-emption checking after resource selection as the number of resources for BR calculation.

For example, a third method using the number of resources having received signal strength (e.g., RSSI) exceeding the specific threshold in the partial sensing slot in which sensing was performed before the resource (re)selection was triggered may be applied when only periodic transmission is configured to be allowed in a resource pool.

For example, the third method may be applied when both periodic transmission and aperiodic transmission are allowed.

For example, the third method may be applied when it is configured to allow only resource selection based on partial sensing.

For example, the third method may be applied when both partial sensing-based resource selection and random resource selection are allowed, and resource re-evaluation or pre-emption confirmation is not allowed.

For example, a fourth method using the sum of the number of resources having received signal strength (e.g., RSSI) exceeding the specific threshold within partial sensing slots in which sensing was performed before resource (re) selection was triggered and the number of resources whose received signal strength (e.g., RSSI) exceeds the specific threshold in slots additionally sensed for resource re-evaluation and/or pre-emption checking after resource selection may be applied when only periodic transmission is configured to be allowed in a resource pool.

For example, the fourth method may be applied when both periodic transmission and aperiodic transmission are allowed.

For example, the fourth method may be applied when it is configured to allow only resource selection based on partial sensing.

For example, the fourth method may be applied when both partial sensing-based resource selection and random resource selection are allowed, and resource re-evaluation or pre-emption confirmation is not allowed.

According to an embodiment of the present disclosure, in the case of a UE performing partial sensing, or a UE checking resource re-evaluation and/or pre-emption, in order to increase the number of resources used for CBR estimation, the UE may include reserved transmission resources of other UEs identified through PSCCH decoding in CBR estimation. For example, a UE may use RSSI of a PSCCH signaling a corresponding transmission resource reservation and/or a PSSCH related to the PSCCH as an RSSI of the reserved transmission resource. For example, RSSI of the reserved transmission resource may be used as a specific setting value or a value configured by network.

According to an embodiment of the present disclosure, considering the case where a reserved transmission resource is dropped due to prioritization of UL-SL transmission or the case where it is dropped due to collision and prioritization with PSFCH transmission, the number of reserved transmission resources may be adjusted based on a specific setting value or a value configured by network. Alternatively, the number of reserved transmission resources may be adjusted based on a specific setting value or a value configured by network in consideration of a case where resource reselection occurs due to a transmission collision detected by resource re-evaluation or pre-emption. For example, the number of reserved transmission resources may be scaled by multiplying the number of reserved transmission resources by a specific setting value or a value configured by network. Or, for example, the number of reserved transmission resources may be used as a specific setting value or a value configured by network.

According to an embodiment of the present disclosure, in the case of a UE performing random resource selection, a UE may perform CBR estimation based on the RSSI according to the above-described methods (For example, an estimation method using the sensing slot itself and an estimation method by including a reserved transmission resource identified through a PSCCH, etc.), based on the result of sensing through short-term sensing or partial sensing performed for resource re-evaluation and pre-emption checking. For example, a UE that performs random resource selection and short-term sensing or partial sensing for resource re-evaluation and pre-emption checking may use a specific setting value or a value configured by network as a value for the total number of resources valid in the resource pool used for the CBR estimation. For example, the total number of valid resources in the resource pool may be the total number of valid resources included in a CBR measurement window or sensing window in the resource pool.

According to an embodiment of the present disclosure, a UE performing random resource selection and resource re-evaluation or pre-emption checking may determine the final CBR value, by applying an adjustment value based on a CBR value estimated at the present time point to the default CBR value determined a specific setting value or a value configured by network, considering the inaccuracy of CBR measurement.

For example, a UE performing a partial sensing may determine the final CBR value, by applying an adjustment value based on a CBR value estimated at the present time point to the default CBR value determined as a specific setting value or a value configured by network, considering the inaccuracy of CBR measurement.

For example, a UE performing CBR based on PSFCH may determine the final CBR value, by applying an adjustment value based on a CBR value estimated at the present time point to the default CBR value determined as a specific setting value or a value configured by network, considering the inaccuracy of CBR measurement.

For example, the adjustment value may be a specific setting value or a value configured by network. For example, if the CBR value estimated at the present time point is greater than a default CBR value, the final CBR value may be determined by adding the adjusted value to the CBR value estimated at the present time point. For example, if the CBR value estimated at the present time point is smaller than a default CBR value, the final CBR value may be determined by subtracting the adjusted value from the CBR value estimated at the present time point.

For example, at least one UE among a UE performing random resource selection and performing resource re-evaluation or pre-emption checking, a UE performing partial sensing, or a UE performing CBR based on a PSFCH, may determine the final CBR value by applying an adjustment value based on a CBR value estimated at the present time point or an adjustment value determined as a specific setting value to the CBR value estimated at a past time point. For example, if a CBR value estimated at a past time point is less than the default CBR value, a final CBR value may be determined by adding an adjustment value based on the CBR value estimated at the present time point or an adjustment value determined as a specific setting value to the CBR value estimated at a past time point. For example, if a CBR value estimated at a past time point is greater than a default CBR value, the final CBR value may be determined by subtracting an adjustment value based on a CBR value estimated at the present time point or an adjustment value determined as a specific setting value from the CBR value estimated at a past time point.

According to an embodiment of the present disclosure, a CBR value of power saving UEs may be shared with neighboring power saving UEs, and a UE may determine the final CBR value by applying both a CBR value estimated by the UE itself and the shared CBR value. For example, the shared CBR value may be transmitted by reducing the data transmission amount to a quantized value, or may be transmitted through 1-bit signaling indicating only an increase/decrease of the current CBR compared to the past CBR. For example, the 1-bit signaling may be transmitted through a reserved bit of SCI. For example, the SCI may be the first SCI.

For example, when all of the neighboring UEs sharing CBR or member UEs in a group performing groupcast indicate a CBR increase or decrease, a UE that has shared CBR may increase its own CBR value by a specific setting value or a value configured by network.

For example, when any one of neighboring UEs sharing CBR or member UEs in a group performing groupcast indicates a CBR increase or decrease, a UE that has shared CBR may increase its own CBR value by a specific setting value or a value configured by network.

For example, when all of the neighboring UEs sharing CBR or member UEs in a group performing groupcast indicate a CBR increase or decrease, a UE that has shared CBR may decrease its own CBR value by a specific setting value or a value configured by network.

For example, when any one of neighboring UEs sharing CBR or member UEs in a group performing groupcast indicates a CBR increase or decrease, a UE that has shared CBR may decrease its own CBR value by a specific setting value or a value configured by network.

For example, when an estimated CBR value of UE-A is transmitted to UE-B, UE-B may use the estimated CBR value of UE-A to adjust a transmission resource and a transmission opportunity of UE-B. For example, based on at least one of a case in which the UE-A is a relaying UE and the UE-B is a remote UE, a case in which UE-A is an inter-UE coordinating UE and UE-B is an inter-UE coordinated UE, a case in which UE-B is a UE performing random resource selection, or a case in which UE-B is a UE without sensing capability, UE-A may transmit the estimated CBR value of the UE-A to UE-B.

According to an embodiment of the present disclosure, a UE performing resource selection based on partial sensing may estimate and use CBR based on partial sensing described above, when the number of partial sensing slots is greater than or equal to a specific threshold. For example, when the number of partial sensing slots is smaller than the specific threshold value, a specific setting value or a value configured by network may be used as a default CBR as the final CBR.

According to an embodiment of the present disclosure, a UE performing resource selection based on partial sensing may estimate CBR in the slot y, as a value dividing the number of partial sensing slots for which a measured RSSI value exceeds a specific threshold among partial sensing slots existing within a window having a length of a specific setting value with the number of total valid SL transmission resources present in the window having the length of the specific setting value.

According to an embodiment of the present disclosure, a P-UE that selects a resource based on partial sensing or randomly selects a resource may use a specific setting value or a default CBR value configured by network, if the number of resources sensed within the CBR measurement window, partial sensing window, or short-term sensing window is less than or equal to a specific threshold, or if the number of all resources sensed within the above windows is less than or equal to a specific threshold.

For example, a P-UE that selects a resource based on partial sensing or randomly selects a resource may measure CBR, and use the measured CBR value, if the number of resources sensed within the CBR measurement window, partial sensing window, or short-term sensing window is greater than or equal to a specific threshold, or if the number of all resources sensed within the above windows is greater than or equal to a specific threshold.

According to an embodiment of the present disclosure, in the case of a UE performing partial sensing, a CBR measurement window may be configured within a partial sensing slot. For example, instead of a CBR measurement window, it may be configured as the number of partial sensing slots closest in time to the slot for which a CBR value is to be determined or the number of all types of sensing slots including sensing for resource re-evaluation and pre-emption checking. Here, for example, all types of sensing slots may include sensing slots performed for SL DRX operation.

According to an embodiment of the present disclosure, in the case of a UE performing partial sensing, a CBR measurement window may be configured as a partial sensing window. For example, in a case of a UE performing random resource selection, a UE may configure a CBR measurement window as a short-term sensing window or partial sensing window performed after the resource (re)selection is triggered.

According to various embodiments of the present disclosure, the proposed CBR measurement method can minimize CBR measurement accuracy loss in the case of a UE that selects a resource based on partial sensing.

On the other hand, in the case of a UE having no sensing capability, only random resource selection is performed, so that a problem in which the probability of collision with other UE transmission resources increases may occur.

According to various embodiments of the present disclosure, in the case of a UE having no sensing capability, a method and device for selecting a resource based on similar sensing through PSFCH reception are proposed.

For example, among the power saving UEs, there may be a UE that performs only random resource selection because they do not have a sensing capability. For example, since the UE randomly selects transmission resources, there may be a high probability of collision with resources transmitted by neighboring UEs. In this case, if the UE uses a PSFCH supported for unicast service, the resource collision probability can be minimized.

According to an embodiment of the present disclosure, a UE receiving a PSFCH may regard PSCCH/PSSCH slots related to the PSFCH as slots transmitted by other UEs, and may exclude resources matching all or some transmission resources expected by a transmission period within a resource selection window in the resource selection, based on all or some possible SL resource transmission periods configured for that resource pool. For example, the excluded transmission resource may be determined based on at least one of the number of partial sensing slots, the interval between partial sensing slots, the partial sensing pattern (e.g., k expressed as a bitmap), or the number of candidate resources in the resource selection window Y.

For example, the operation of excluding transmission resources of other UEs based on a PSFCH may be performed when periodic transmission is allowed in the corresponding resource pool.

For example, the operation of excluding transmission resources of other UEs based on a PSFCH may be performed when a resource selection method based on partial sensing is allowed.

For example, the operation of excluding transmission resources of other UEs based on a PSFCH may be performed when it's configured to allow random resource selection in the corresponding resource pool and resource re-evaluation or pre-emption checking is allowed.

For example, the operation of excluding transmission resources of other UEs based on a PSFCH may be performed when HARQ feedback is enabled for the corresponding resource pool.

For example, the operation of excluding transmission resources of other UEs based on a PSFCH may be considered together with an operation of selecting a resource based on sensing through a PSCCH and used for resource selection, even in at least one of a case in which it is a UE that selects a resource based on full sensing, a case in which it is a UE that selects a resource based on partial sensing, or a case in which it is a UE that randomly selects a resource.

For example, the operation of excluding transmission resources of other UEs based on a PSFCH may be used for performing the final resource re-selection, also for re-evaluation and pre-emption checking operations for selected resources, by being considered in resource re-evaluation or pre-emption checking together with short-term sensing or partial sensing performed ahead of a certain period in time for the selected resource.

According to an embodiment of the present disclosure, a UE receiving a PSFCH while performing full sensing or partial sensing may calculate a final CBR by summing a CBR by PSCCH/PSSCH reception and a CBR by PSFCH reception. For example, a UE that randomly selects a resource may calculate a final CBR by adding a CBR by PSFCH reception to a default CBR value configured to a specific setting value or a value configured by network.

For example, a UE randomly selecting a resource may calculate the final CBR value by adding a default CBR value configured to a specific setting value or a value configured by network, a CBR value by PSFCH reception, and a CBR value included by considering a PSCCH/PSSCH slot related to the PSFCH as a slot transmitted by another UE.

For example, the operation of calculating CBR based on a PSFCH may be performed when periodic transmission is allowed in the corresponding resource pool.

For example, the operation of calculating CBR based on a PSFCH may be performed when a resource selection method based on partial sensing is allowed.

For example, the operation of calculating CBR based on a PSFCH may be performed when random resource selection is allowed in the corresponding resource pool and resource re-evaluation or pre-emption confirmation is allowed.

For example, the operation of calculating CBR based on a PSFCH may be performed when HARQ feedback is enabled for the corresponding resource pool.

According to an embodiment of the present disclosure, in the case of a UE performing full sensing, partial sensing, or performing random resource selection, and transmitting a PSFCH, the UE may include a resource used for transmitting a PSFCH in addition to a resource used for transmitting a PSCCH/PSSCH in the UE's own CBR calculation. For example, the operation of including the PSFCH resource in a CBR calculation may be performed when HARQ feedback is enabled for the corresponding resource pool.

According to an embodiment of the present disclosure, a UE without sensing capability or reception capability may perform open-loop power control based on SL pathloss based on the power of the received PSFCH signal. For example, a UE having no reception capability may include a UE having no reception capability except for S-SSB or PSFCH. For example, a parameter such as alpha or beta related to open-loop power control for the UE may be configured separately or differently from a parameter configured for a UE performing full sensing, partial sensing, or resource re-evaluation/pre-emption checking.

According to an embodiment of the present disclosure, as described above, based on a PSCCH/PSSCH slot/resource related to a detected/decoded PSFCH, a UE may perform pre-emption checking on a selected resource. For example, the priority of the related PSCCH/PSSCH slot may be determined by a specific setting value or a value configured by network. For example, the priority to perform the PSFCH-based pre-emption may be configured based on at least one of higher layer priority, cast type, congestion control, transmit power, HARQ enable/disable status, ACK/NACK ratio, SL DRX operation status, inter-UE coordination status, relaying UE priority, synchronization priority, MCS, number of layers, CSI, remaining battery power, remaining PDB, remaining number of retransmissions, peer UE type (For example, V-UE, P-UE), latency requirements, requirements for reliability or requirements for distance. For example, the priority to perform the PSFCH-based pre-emption may be configured to a specific setting value or determined by a value configured by network.

According to an embodiment of the present disclosure, a PSFCH resource in transmission through a resource selected based on partial sensing and a PSFCH resource in transmission through a randomly selected resource may be separately configured. For example, the two PSFCH resources may be TDM or FDM and may not overlap each other. For example, although the two PSFCH resources overlap each other, interference between the two PSFCHs can be minimized through CDM.

According to various embodiments of the present disclosure, in the case of a UE having no sensing capability, the probability of collision with transmission resources of other UEs can be minimized through a method of selecting a resource based on similar sensing through PSFCH reception.

Figure 9:
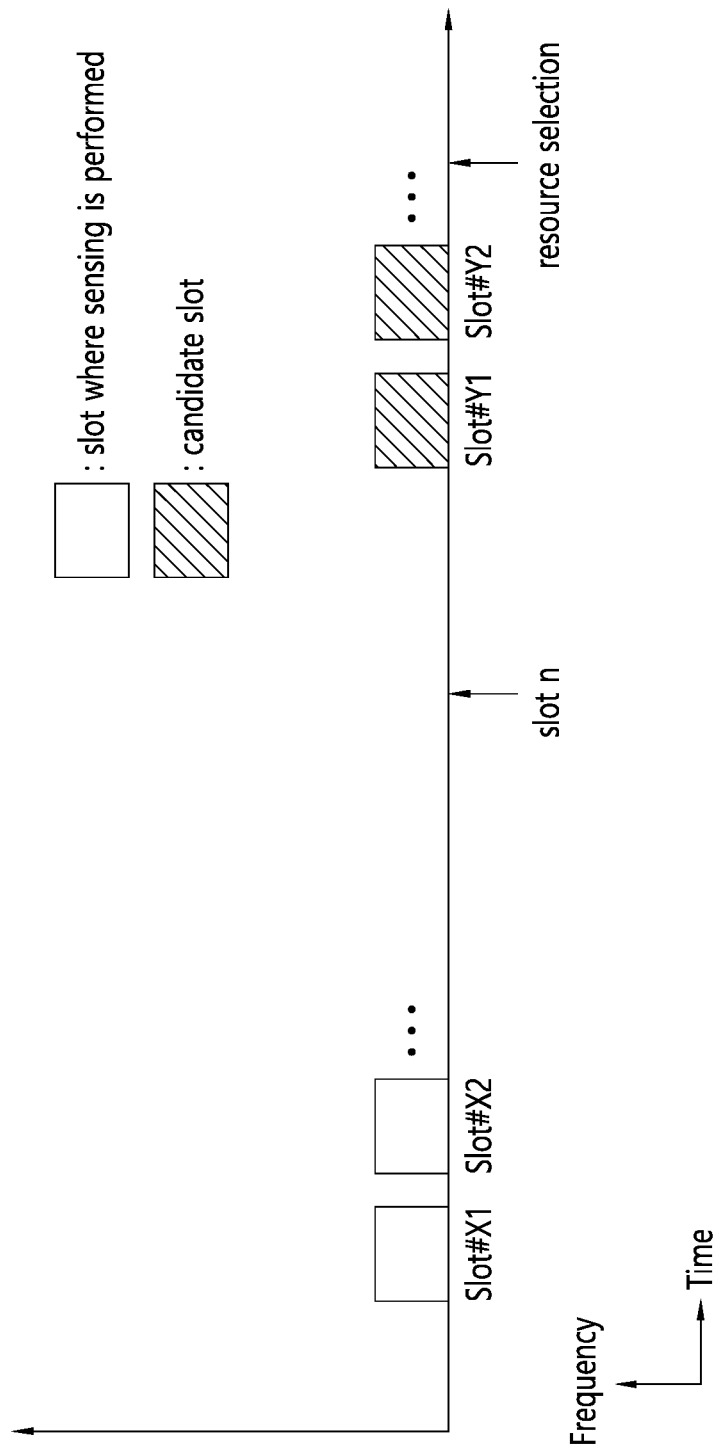
FIG. 9 shows an example of performing partial sensing according to an embodiment of the present disclosure.

FIG. 9 shows an example of performing partial sensing according to an embodiment of the present disclosure. The embodiment of FIG. 9 may be combined with various embodiments of the present disclosure.

Referring to FIG. 9, a transmitting UE may determine at least one first candidate slot for selecting a first SL resource. Here, for example, slot #Y1 and slot #Y2 may be at least one candidate slot.

For example, a transmitting UE may perform sensing on at least one first slot related to the at least one first candidate slot. For example, slot #X1 and slot #X2 may be the at least one first slot. For example, slot #X1 and slot #X2 may be determined based on the number, corresponding to a specific setting value, of periods from the slot #Y1 or slot #Y2. For example, the periods may be periods of transmission resources configured in a resource pool. For example, resources (slot #X1, slot #X2) of a time point ahead by an integer multiple k value of each of the period temporally prior to the time point of the candidate resource (slot #Y1 or slot #Y2) to be determined for resource collision may be sensed. For example, the k value may be configured in a bitmap format. For example, the at least one first slot may be a slot in which sensing is performed before a time (slot n) at which resource (re)selection is triggered.

For example, a transmitting UE may select the first SL resource within the at least one first candidate slot based on the sensing. For example, a transmitting UE may transmit first SCI including information for scheduling a PSSCH related to the PSCCH to a receiving UE through a PSCCH based on the first SL resource. For example, a transmitting UE may transmit second SCI or data to a receiving UE through a PSSCH related to the PSCCH based on the first SL resource.

For example, based on the number of the at least one first slot being greater than or equal to a first threshold value, a transmitting UE may measure a first CBR related to the at least one first slot. For example, the first CBR may be measured based on the total number of valid resources in the at least one first slot.

For example, the first CBR may be measured based on the number of resources with a received signal strength indicator (RSSI) greater than a second threshold in the at least one first slot.

For example, the first CBR may be measured based on the at least one first slot and a transmission resource reserved by another UE, the transmission resource reserved by the another UE may be determined based on PSCCH decoding related to the transmission resource For example, an RSSI of the transmission resource may be determined as an RSSI for the PSCCH or a PSSCH related to the PSCCH.

Or, for example, based on the number of the at least one first slot being smaller than a first threshold value, a transmitting UE may determine a first CBR related to the at least one first slot as a default CBR value. For example, the default CBR value may be a pre-configured value from a base station or network.

For example, a transmitting UE may adjust the first CBR value based on a default CBR value and the first CBR value. For example, the default CBR value may be a pre-configured value from a base station or network.

For example, a transmitting UE may determine the final CBR value by applying an adjustment value based on a first CBR value estimated at the present time point to the default CBR value. For example, the adjustment value may be a specific setting value or a value configured by network.

For example, if a first CBR value estimated at the present time point is greater than a default CBR value, a transmitting UE may determine the final CBR value by adding the adjusted value to a first CBR value estimated at the present time point. For example, if a first CBR value estimated at the present time point is smaller than a default CBR value, a transmitting UE may determine the final CBR value by subtracting the adjusted value from a first CBR value estimated at the present time point.

For example, if a CBR value estimated at the past time point is smaller than a default CBR value, the final CBR value may be determined by adding an adjustment value based on a first CBR value estimated at the present time point or an adjustment value determined as a specific setting value to the CBR value estimated at the past time point. For example, if the CBR value estimated at a past time point is greater than a default CBR value, the final CBR value is determined by subtracting an adjustment value based on a first CBR value estimated at the present time point or an adjustment value determined by a specific setting value from a CBR value estimated at a past time point.

For example, information related to the first CBR value may be shared with at least one neighboring UE. For example, a transmitting UE may determine the final CBR value based on information related to the first CBR value and a third CBR value shared by the at least one neighboring device. For example, the information related to the first CBR value may include 1 bit representing an increase or decrease of the first CBR value with respect to a previously measured CBR value. For example, based on the at least one neighboring UE being at least one of a remote UE, an inter-UE coordinated UE, a UE selecting random resources, or a UE without sensing capability, information related to the first CBR value may be used by the at least one neighboring device.

Figure 10:
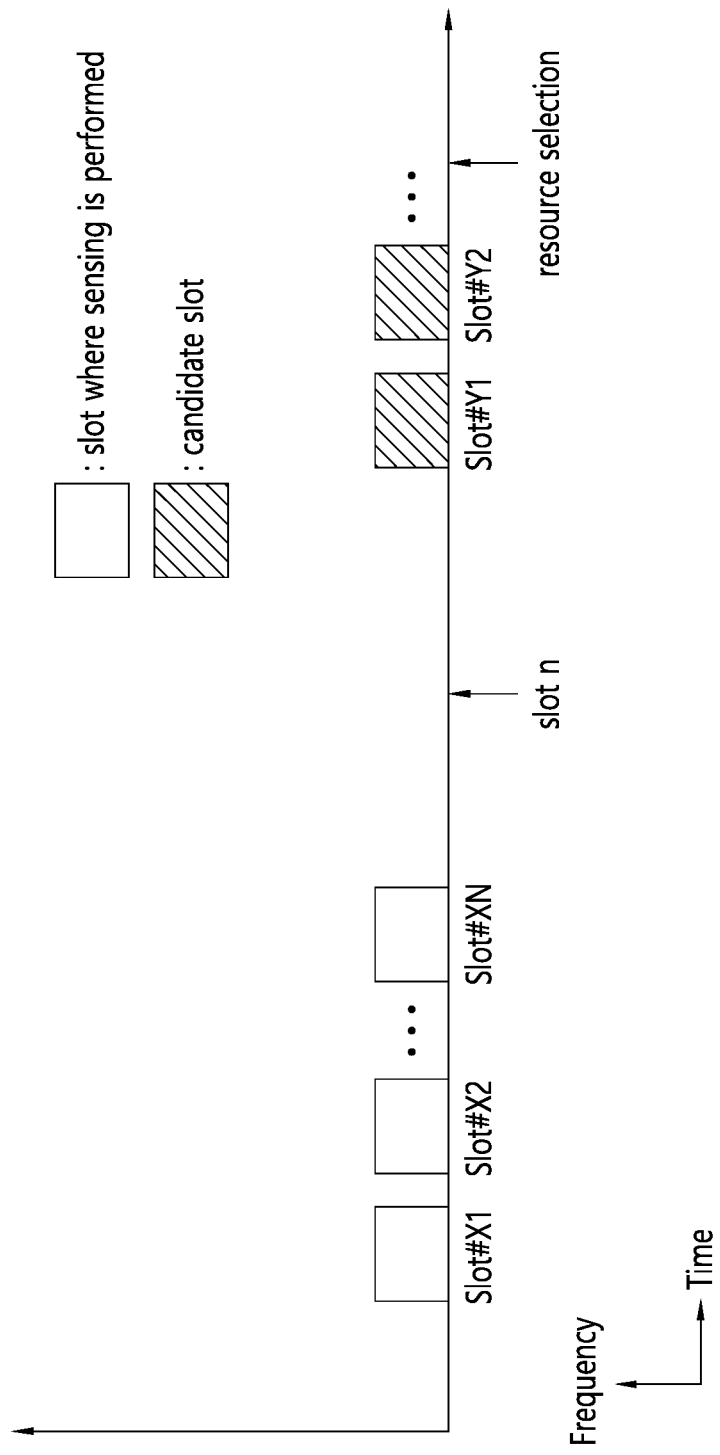
FIG. 10 shows another example of performing partial sensing according to an embodiment of the present disclosure.

FIG. 10 shows another example of performing partial sensing according to an embodiment of the present disclosure. The embodiment of FIG. 10 may be combined with various embodiments of the present disclosure.

Referring to FIG. 10, a transmitting UE may determine at least one first candidate slot for selecting a first SL resource. Here, for example, slot #Y1 and slot #Y2 may be at least one candidate slot.

For example, a transmitting UE may perform sensing on at least one first slot related to the at least one first candidate slot. For example, slot #X1 and slot #X2 may be the at least one first slot. For example, slot #X1 and slot #X2 may be determined based on the number, corresponding to a specific setting value, of periods from the slot #Y1 or slot #Y2. For example, the periods may be periods of transmission resources configured in a resource pool. For example, a resource (slot #X1, slot #X2) at a time point ahead by an integer multiple k value of each period prior to the time point of the candidate resource (slot #Y1 or slot #Y2) to be determined as a resource collision may be sensed. For example, the k value may be configured in a bitmap format. For example, the at least one first slot may be a slot in which sensing is performed before a time (slot n) at which resource (re)selection is triggered.

For example, a transmitting UE may select the first SL resource within the at least one first candidate slot based on the sensing. For example, a transmitting UE may transmit first SCI including information for scheduling a PSSCH related to the PSCCH to a receiving UE through a PSCCH based on the first SL resource. For example, a transmitting UE may transmit second SCI or data to a receiving UE through a PSSCH related to the PSCCH based on the first SL resource.

For example, after selecting the first SL resource, a transmitting UE may trigger at least one of re-evaluation and pre-emption. For example, a transmitting UE may additionally sense at least one third slot based on at least one of re-evaluation and pre-emption. For example, slot #XN may be at least one third slot. For example, a transmitting UE may measure first CBR based on the at least one first slot and the at least one third slot.

For example, a transmitting UE may measure first CBR based on the total number of valid resources in the at least one first slot and the total number of valid resources in the at least one third slot.

For example, the first CBR may be measured based on the number of resources having a received signal strength indicator (RSSI) greater than a second threshold in the at least one first slot.

For example, a transmitting UE may measure first CBR based on the number of resources whose received signal strength (e.g., RSSI) exceeds a specific threshold in at least one first slot in which sensing was performed before resource (re)selection trigger time (slot n) and the number of resources having received signal strength (e.g., RSSI) exceeding the specific threshold in at least one third slot additionally sensed for resource re-evaluation and/or pre-emption checking after resource selection.

Figure 11:
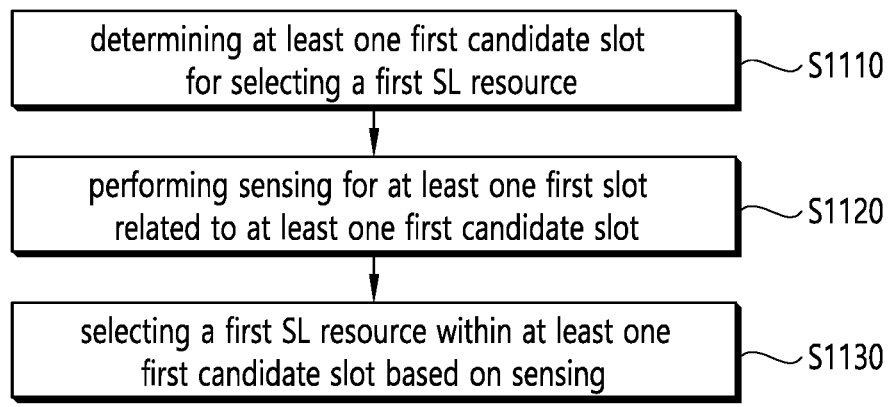
FIG. 11 shows a method of measuring a first CBR related to at least one first slot by a first device according to an embodiment of the present disclosure.

FIG. 11 shows a method of measuring a first CBR related to at least one first slot by a first device according to an embodiment of the present disclosure. The embodiment of FIG. 11 may be combined with various embodiments of the present disclosure.

Referring to FIG. 11, in step S1110, a first device 100 may determine at least one first candidate slot for selecting a first sidelink (SL) resource.

In step S1120, the first device 100 may perform sensing for at least one first slot related to the at least one first candidate slot.

In step S1130, the first device 100 may select the first SL resource within the at least one first candidate slot based on the sensing.

For example, first channel busy ratio (CBR) related to the at least one first slot may be measured, based on a number of the at least one first slot greater than or equal to a first threshold.

For example, the first CBR may be measured based on a total number of valid resources in the at least one first slot.

For example, the first CBR may be measured based on a number of resources with a received signal strength indicator (RSSI) greater than a second threshold in the at least one first slot.

For example, the first CBR may be measured based on at least one third slot sensed based on at least one of re-evaluation and pre-emption after the at least one first slot and the first SL resource are selected.

For example, the first CBR may be measured based on the at least one first slot and a transmission resource reserved by a third device. For example, the transmission resource reserved by the third device may be determined based on physical sidelink control channel (PSCCH) decoding related to the transmission resource. For example, an RSSI of the transmission resource may be determined as an RSSI for the PSCCH or a physical sidelink shared channel (PSSCH) related to the PSCCH.

For example, the first device 100 may determine at least one second candidate slot for selecting a second SL resource. For example, the first device 100 may perform sensing for at least one second slot related to the at least one second candidate slot. For example, the first device 100 may select the second SL resource in the at least one second candidate slot based on the sensing.

For example, second CBR related to the at least one second slot may be determined as a default CBR value, based on a number of the at least one second slot less than the first threshold.

For example, a value of the first CBR may be adjusted, based on a default CBR value and the value of the first CBR.

For example, information related to a value of the first CBR may be shared with at least one neighboring device. For example, a final CBR value may be determined based on the value of the first CBR and information related to a value of third CBR shared with the at least one neighboring device. For example, the information related to the value of the first CBR may include 1 bit representing an increase or decrease of the value of the first CBR with respect to a previously measured value of CBR. For example, the information related to the value of the first CBR may be used by the at least one neighboring device, based on the at least one neighboring device being at least one of a remote UE, an inter-UE coordinated UE, a UE selecting a random resource, or a UE without sensing capability.

For example, a period for measuring the first CBR may be configured within an interval related to the at least one first slot.

The above-described embodiment may be applied to various devices described below. For example, a processor 102 of a first device 100 may determine at least one first candidate slot for selecting a first sidelink (SL) resource. And, for example, the processor 102 of the first device 100 may perform sensing for at least one first slot related to the at least one first candidate slot. And, for example, the processor 102 of the first device 100 may select the first SL resource within the at least one first candidate slot based on the sensing.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: determine at least one first candidate slot for selecting a first sidelink (SL) resource; perform sensing for at least one first slot related to the at least one first candidate slot; and select the first SL resource within the at least one first candidate slot based on the sensing. For example, first channel busy ratio (CBR) related to the at least one first slot may be measured, based on a number of the at least one first slot greater than or equal to a first threshold.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: determine at least one first candidate slot for selecting a first sidelink (SL) resource; perform sensing for at least one first slot related to the at least one first candidate slot; and select the first SL resource within the at least one first candidate slot based on the sensing. For example, first channel busy ratio (CBR) related to the at least one first slot may be measured, based on a number of the at least one first slot greater than or equal to a first threshold.

According to an embodiment of the present disclosure, a non-transitory computer-readable storage medium storing instructions may be proposed. For example, the instructions, when executed, may cause a first device to: determine at least one first candidate slot for selecting a first sidelink (SL) resource; perform sensing for at least one first slot related to the at least one first candidate slot; and select the first SL resource within the at least one first candidate slot based on the sensing. For example, first channel busy ratio (CBR) related to the at least one first slot may be measured, based on a number of the at least one first slot greater than or equal to a first threshold.

Figure 12:
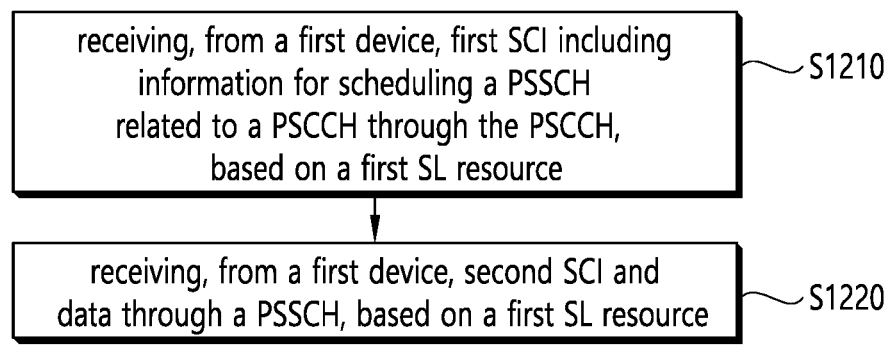
FIG. 12 shows a method for a second device to receive data from a first device according to an embodiment of the present disclosure.

FIG. 12 shows a method for a second device to receive data from a first device according to an embodiment of the present disclosure. The embodiment of FIG. 12 may be combined with various embodiments of the present disclosure.

Referring to FIG. 12, in step S1210, a second device 200 may receive, from a first device 100, first sidelink control information (SCI) including information for scheduling a physical sidelink shared channel (PSSCH) related to a physical sidelink control channel (PSCCH) through the PSCCH, based on a first sidelink (SL) resource.

In step S1220, the second device 200 may receive, from the first device 100, second SCI and data through the PSSCH, based on the first SL resource.

For example, first channel busy ratio (CBR) related to the at least one first slot may be measured, based on a number of the at least one first slot greater than or equal to a first threshold.

For example, the first CBR may be measured based on a total number of valid resources in the at least one first slot.

For example, the first CBR may be measured based on a number of resources with a received signal strength indicator (RSSI) greater than a second threshold in the at least one first slot.

For example, the first CBR may be measured based on at least one third slot sensed based on at least one of re-evaluation and pre-emption after the at least one first slot and the first SL resource are selected.

For example, the first CBR may be measured based on the at least one first slot and a transmission resource reserved by a third device. For example, the transmission resource reserved by the third device may be determined based on physical sidelink control channel (PSCCH) decoding related to the transmission resource. For example, an RSSI of the transmission resource may be determined as an RSSI for the PSCCH or a physical sidelink shared channel (PSSCH) related to the PSCCH.

For example, at least one second candidate slot for selecting a second SL resource may be determined. For example, sensing for at least one second slot related to the at least one second candidate slot may be performed. For example, the second SL resource may be selected within the at least one second candidate slot based on the sensing.

For example, second CBR related to the at least one second slot may be determined as a default CBR value, based on a number of the at least one second slot less than the first threshold.

For example, a value of the first CBR may be adjusted, based on a default CBR value and the value of the first CBR.

For example, information related to a value of the first CBR may be shared with at least one neighboring device. For example, a final CBR value may be determined based on the value of the first CBR and information related to a value of third CBR shared with the at least one neighboring device. For example, the information related to the value of the first CBR may include 1 bit representing an increase or decrease of the value of the first CBR with respect to a previously measured value of CBR. For example, the information related to the value of the first CBR may be used by the at least one neighboring device, based on the at least one neighboring device being at least one of a remote UE, an inter-UE coordinated UE, a UE selecting a random resource, or a UE without sensing capability.

For example, a period for measuring the first CBR may be configured within an interval related to the at least one first slot.

The above-described embodiment may be applied to various devices described below. First, for example, a processor 202 of a second device 200 may control a transceiver 206 to receive, from a first device 100, first sidelink control information (SCI) including information for scheduling a physical sidelink shared channel (PSSCH) related to a physical sidelink control channel (PSCCH) through the PSCCH, based on a first sidelink (SL) resource. And, for example, the processor 202 of the second device 200 may control the transceiver 206 to receive, from the first device 100, second SCI and data through the PSSCH, based on the first SL resource.

According to an embodiment of the present disclosure, second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive, from a first device, first sidelink control information (SCI) including information for scheduling a physical sidelink shared channel (PSSCH) related to a physical sidelink control channel (PSCCH) through the PSCCH, based on a first sidelink (SL) resource; and receive, from the first device, second SCI and data through the PSSCH, based on the first SL resource. For example, at least one first candidate slot for selecting the first SL resource may be determined. For example, sensing for at least one first slot related to the at least one first candidate slot may be performed. For example, the first SL resource may be selected within the at least one first candidate slot based on the sensing. For example, first channel busy ratio (CBR) related to the at least one first slot may be measured, based on a number of the at least one first slot greater than or equal to a first threshold.

Various embodiments of the present disclosure may be combined with each other.

Various embodiments of the present disclosure may be implemented independently. Alternatively, various embodiments of the present disclosure may be implemented in combination or merged with each other. For example, various embodiments of the present disclosure have been described based on a 3GPP system for convenience of description, but various embodiments of the present disclosure may be extendable to systems other than the 3GPP system. For example, various embodiments of the present disclosure are not limited to direct communication between UEs, and may be used in uplink or downlink, at this time, a base station or a relay node may use the proposed method according to various embodiments of the present disclosure. For example, information on whether a method according to various embodiments of the present disclosure is applied may be defined to be informed, by a base station to a UE, or by a second device 200 to a receiving UE, through a predefined signal (eg, physical layer signal or higher layer signal). For example, information on rules according to various embodiments of the present disclosure may be defined to be informed, by a base station to a UE, or a second device 200 to a receiving UE, through a predefined signal (eg, physical layer signal or higher layer signal).

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
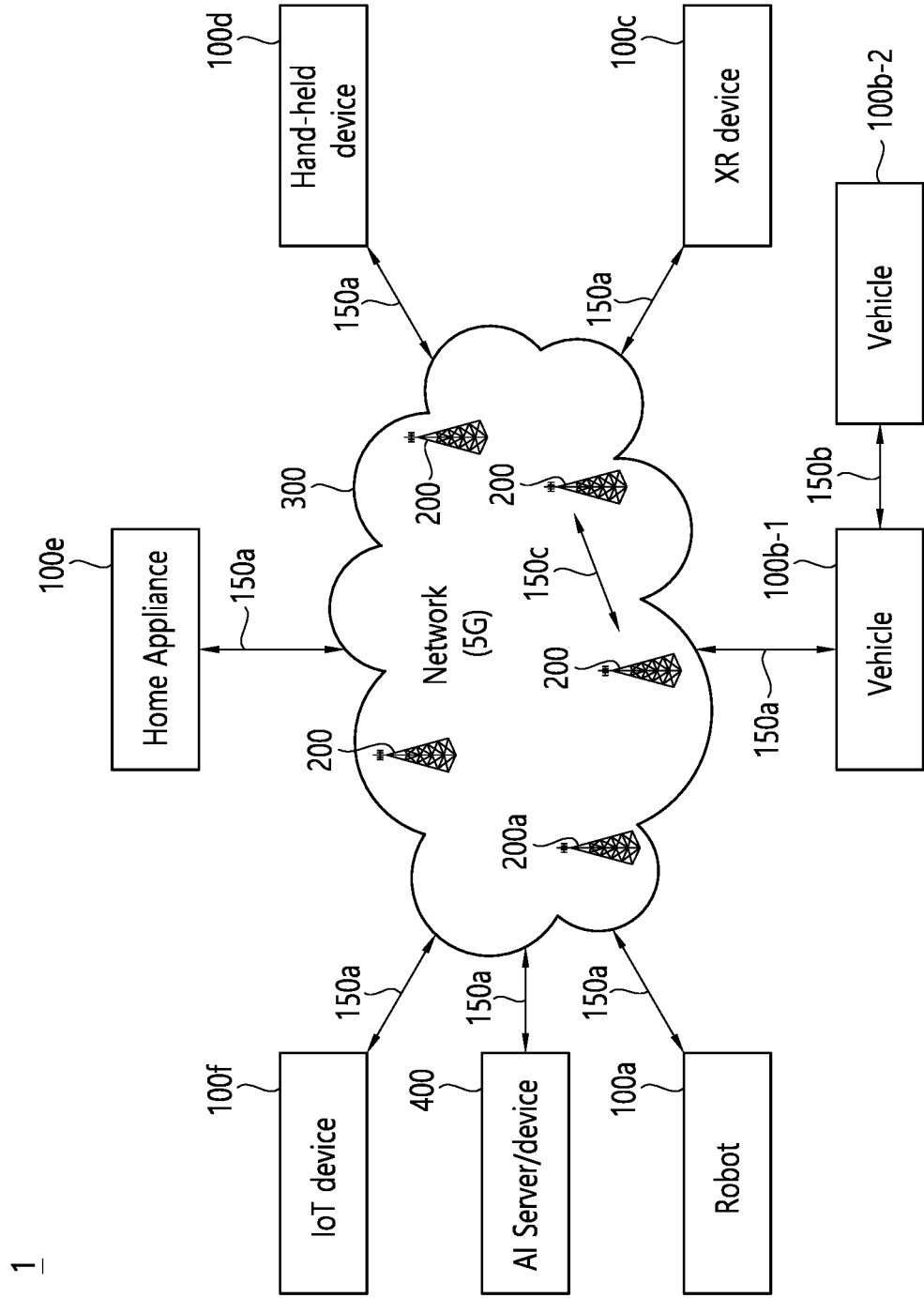
FIG. 13 shows a communication system 1, based on an embodiment of the present disclosure.

FIG. 13 shows a communication system 1, based on an embodiment of the present disclosure. The embodiment of FIG. 13 may be combined with various embodiments of the present disclosure.

Referring to FIG. 13, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/13S 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
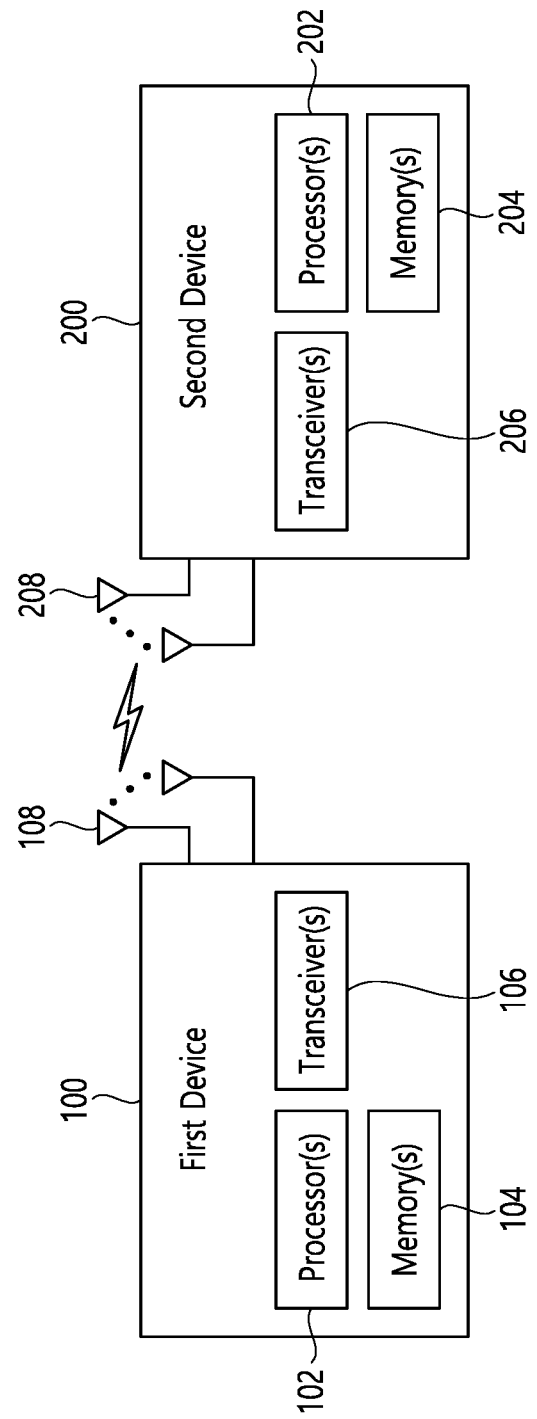
FIG. 14 shows wireless devices, based on an embodiment of the present disclosure.

FIG. 14 shows wireless devices, based on an embodiment of the present disclosure. The embodiment of FIG. 14 may be combined with various embodiments of the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
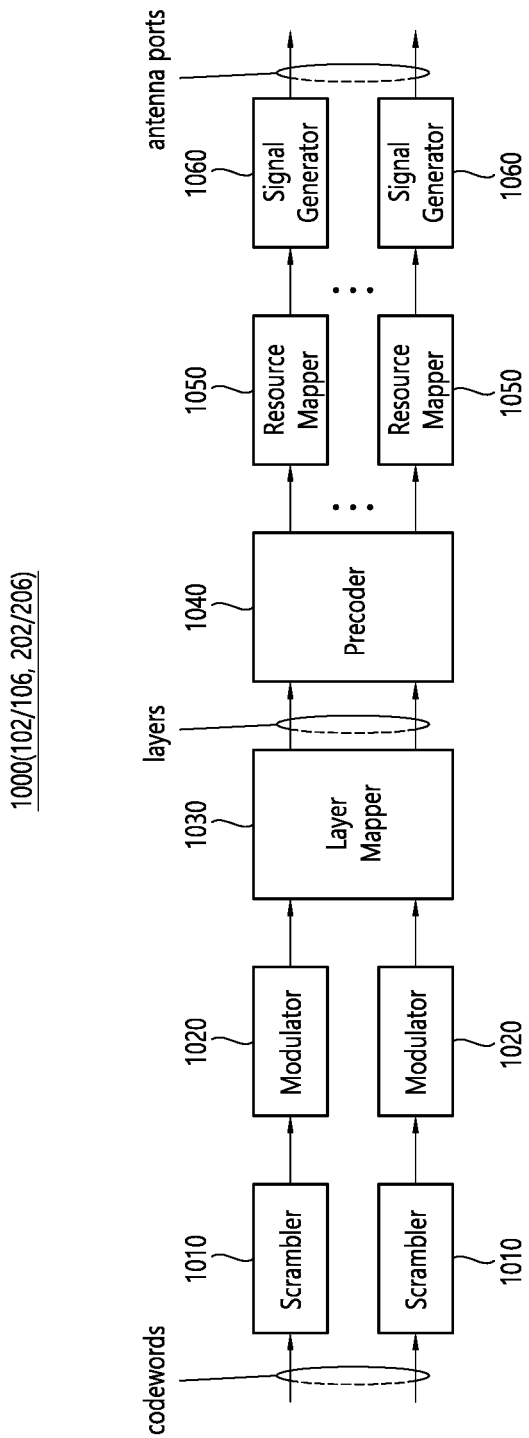
FIG. 15 shows a signal process circuit for a transmission signal, based on an embodiment of the present disclosure.

FIG. 15 shows a signal process circuit for a transmission signal, based on an embodiment of the present disclosure. The embodiment of FIG. 15 may be combined with various embodiments of the present disclosure.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 16:
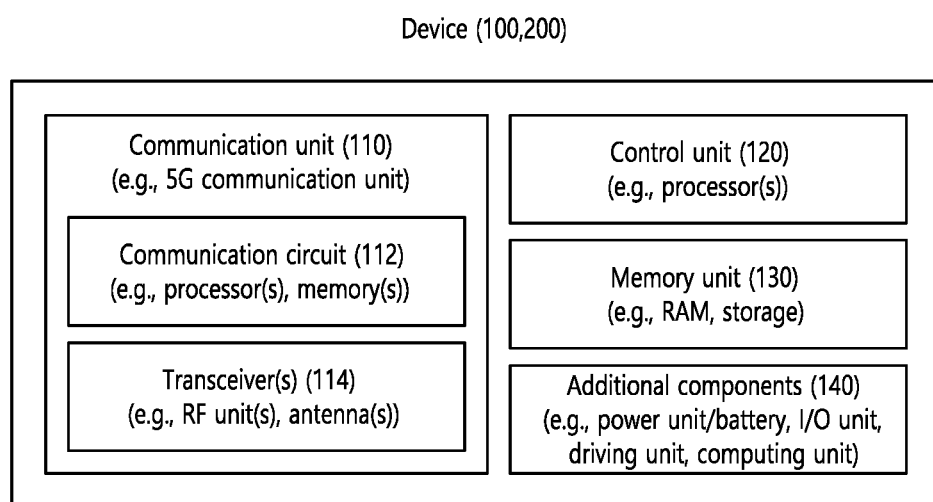
FIG. 16 shows another example of a wireless device, based on an embodiment of the present disclosure.

FIG. 16 shows another example of a wireless device, based on an embodiment of the present disclosure. The wireless device may be implemented in various forms according to a use-case/service (refer to FIG. 13). The embodiment of FIG. 16 may be combined with various embodiments of the present disclosure.

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast UE, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 16 will be described in detail with reference to the drawings.

Figure 17:
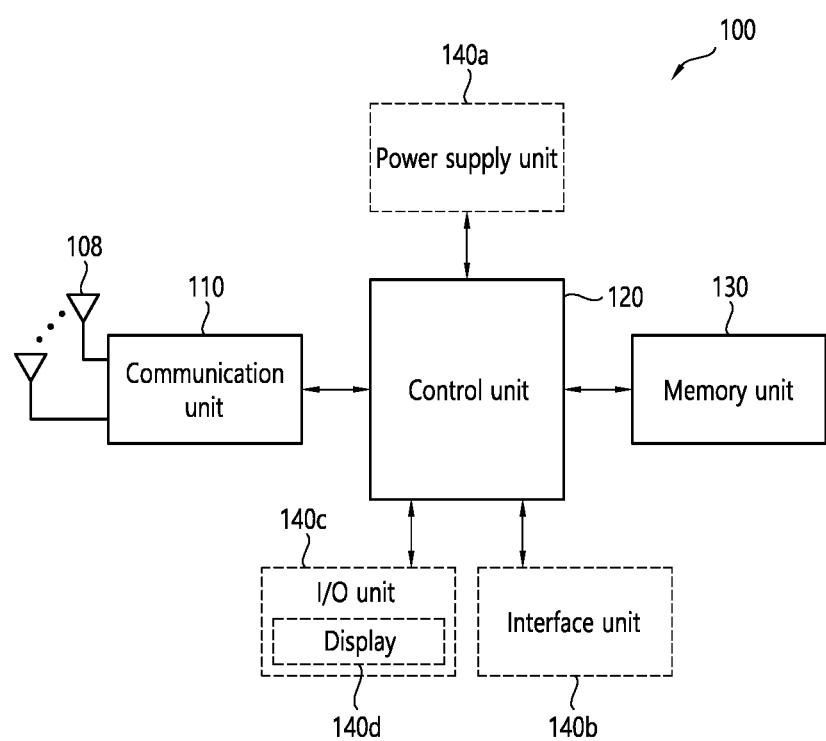
FIG. 17 shows a hand-held device, based on an embodiment of the present disclosure.

FIG. 17 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 17 may be combined with various embodiments of the present disclosure.

Referring to FIG. 17, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 18:
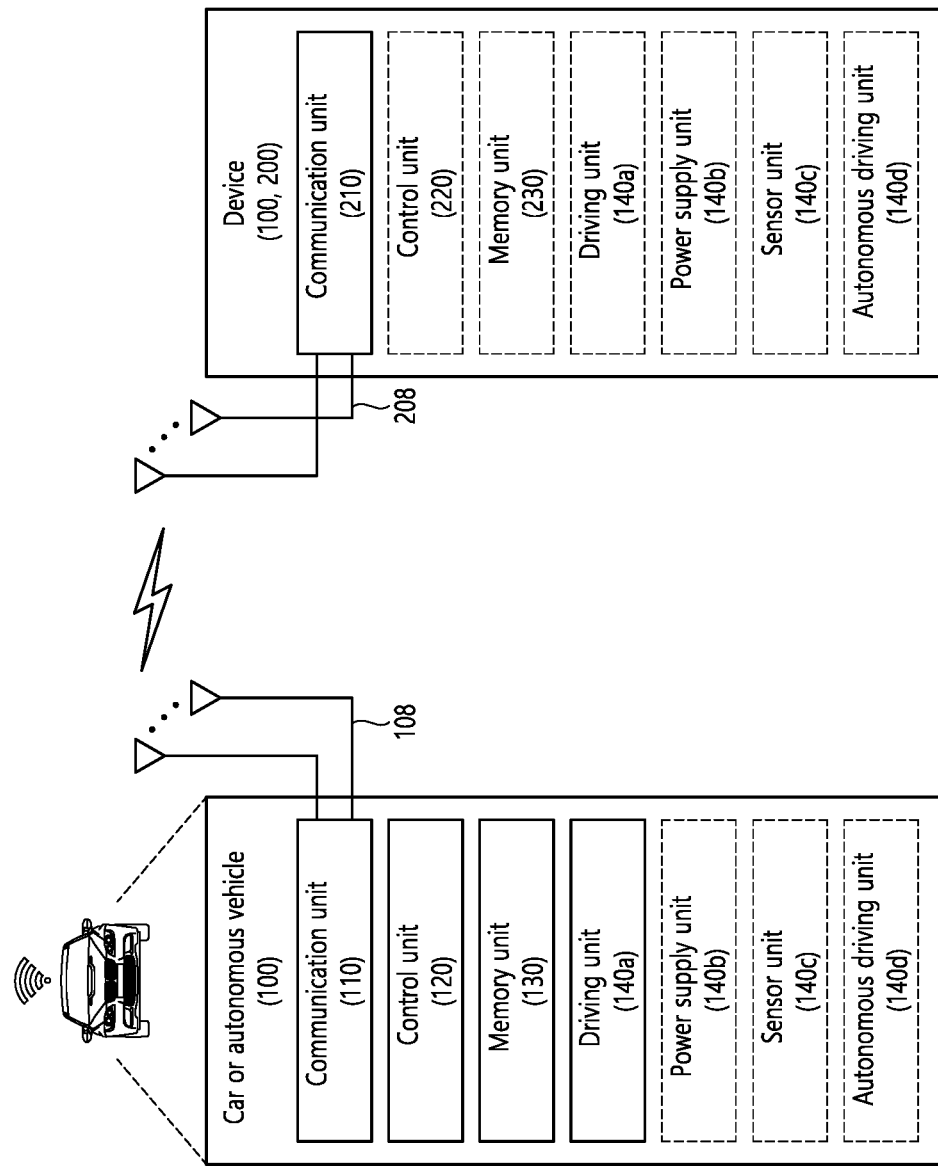
FIG. 18 shows a vehicle or an autonomous vehicle, based on an embodiment of the present disclosure.

FIG. 18 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 18 may be combined with various embodiments of the present disclosure.

Referring to FIG. 18, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient enviromnent information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in a device, and technical features in device claims can be combined to be implemented or performed in a method. Further, technical features in method claim(s) and device claim(s) can be combined to be implemented or performed in a device. Further, technical features in method claim(s) and device claim(s) can be combined to be implemented or performed in a method.

What is claimed is:

1. A method for performing, by a first device, wireless communication, the method comprising:
   determining at least one candidate slot for selecting a sidelink (SL) resource;
   performing partial sensing for at least one sensing slot related to the at least one candidate slot;
   measuring a received signal strength indicator (RSSI) in RSSI measurement slots,
   wherein the RSSI measurement slots include the at least one sensing slot and at least one slot where the first device performs a physical sidelink control channel (PSCCH) reception or a physical sidelink shared channel (PSSCH) reception within a channel busy ratio (CBR) measurement window;
   determining first CBR based on the RSSI measurement,
   wherein the first CBR is determined as i) a portion of a number of resources whose RSSI exceeds a first threshold based on a number of the RSSI measurement slots being greater than or equal to a second threshold, and
   wherein the first CBR is determined as ii) a default CBR value, based on the number of the RSSI measurement slots being less than the second threshold; and
   selecting the SL resource within the at least one candidate slot based on the partial sensing and first CBR.

2. The method of claim 1, wherein the first CBR is calculated based on a total number of valid resources in the RSSI measurement slots.

3. The method of claim 1, wherein the first CBR is calculated based on a number of resources with an RSSI greater than the first threshold in the RSSI measurement slots.

4. The method of claim 1, wherein the first CBR is calculated based on at least one second slot sensed based on at least one of re-evaluation and pre-emption, after the at least one sensing slot and the SL resource being selected.

5. The method of claim 1, wherein the first CBR is calculated based on the at least one slot which is at least one transmission resource reserved by a second device, and
   wherein the at least one transmission resource being reserved by the second device is determined based on PSCCH decoding related to the at least one transmission resource.

6. The method of claim/wherein an RSSI of the transmission resource is determined as an RSSI for the PSCCH or a physical sidelink shared channel (PSSCH) related to the PSCCH.

7. The method of claim 1, wherein the default CBR value is configured by higher layer.

8. The method of claim 1, wherein information related to a value of the first CBR is shared with at least one neighboring device.

9. The method of claim 8, wherein a final CBR value is determined based on the value of the first CBR and information related to a value of second CBR shared with the at least one neighboring device.

10. The method of claim 8, wherein the information related to the value of the first CBR includes 1 bit representing an increase or decrease of the value of the first CBR with respect to a previously measured value of CBR.

11. The method of claim 8, wherein the information related to the value of the first CBR is used by the at least one neighboring device, based on the at least one neighboring device being at least one of a remote UE, an inter-UE coordinated UE, a UE selecting a random resource, or a UE without sensing capability.

12. The method of claim 1, wherein a period for calculating the first CBR is configured within an interval related to the RSSI measurement slots.

13. A first device for performing wireless communication, the first device comprising:
   one or more memories storing instructions;
   one or more transceivers; and
   one or more processors connected to the one or more memories and the one or more transceivers, wherein the one or more processors execute the instructions to:
   determine at least one candidate slot for selecting a sidelink (SL) resource;
   perform partial sensing for at least one sensing slot related to the at least one candidate slot;
   measure a received signal strength indicator (RSSI) in RSSI measurement slots,
   wherein the RSSI measurement slots include the at least one sensing slot and at least one slot where the first device performs a physical sidelink control channel (PSCCH) reception or a physical sidelink shared channel (PSSCH) reception within a channel busy ratio (CBR) measurement window;
   determine first CBR based on the RSSI measurement,
   wherein the first CBR is determined as i) a portion of a number of resources whose RSSI exceeds a first threshold based on a number of the RSSI measurement slots being greater than or equal to a second threshold, and
   wherein the first CBR is determined as ii) a default CBR value, based on the number of the RSSI measurement slots being less than the second threshold; and
   select the SL resource within the at least one candidate slot based on the partial sensing and first CBR.

14. A device adapted to control a first user equipment (UE), the device comprising:
   one or more processors; and
   one or more memories operably connectable to the one or more processors and storing instructions, wherein the one or more processors execute the instructions to:
   determine at least one candidate slot for selecting a sidelink (SL) resource;
   perform partial sensing for at least one slot related to the at least one candidate slot;
   measuring a received signal strength indicator (RSSI) in RSSI measurement slots,
   wherein the RSSI measurement slots include the at least one sensing slot and at least one slot where the first device performs a physical sidelink control channel (PSCCH) reception or a physical sidelink shared channel (PSSCH) reception within a channel busy ratio (CBR) measurement window;
   determine first CBR based on the RSSI measurement,
   wherein the first CBR is determined as i) a portion of a number of resources whose RSSI exceeds a first threshold based on a number of the RSSI measurement slots being greater than or equal to a second threshold, and
   wherein the first CBR is determined as ii) a default CBR value, based on the number of the RSSI measurement slots being less than the second threshold; and
   select the SL resource within the at least one candidate slot based on the partial sensing and first CBR.

* * * * *